United States Patent
Kato

(10) Patent No.: US 8,814,056 B2
(45) Date of Patent: Aug. 26, 2014

(54) ANTENNA DEVICE, RFID TAG, AND COMMUNICATION TERMINAL APPARATUS

(71) Applicant: Murata Manufacturing Co., Ltd., Nagaokakyo (JP)

(72) Inventor: Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/031,270

(22) Filed: Sep. 19, 2013

(65) Prior Publication Data

US 2014/0027520 A1    Jan. 30, 2014

Related U.S. Application Data

(63) Continuation of application No. PCT/JP2012/067537, filed on Jul. 10, 2012.

(30) Foreign Application Priority Data

Jul. 19, 2011 (JP) .................................. 2011-157753

(51) Int. Cl.
    *G06K 19/06* (2006.01)
(52) U.S. Cl.
    USPC .......................................... 235/494; 235/492
(58) Field of Classification Search
    USPC .................................. 235/492, 494
    See application file for complete search history.

(56) References Cited

U.S. PATENT DOCUMENTS

| | | | |
|---|---|---|---|
| 3,364,564 A | 1/1968 | Kurtz et al. |
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,528,222 A | 6/1996 | Moskowitz et al. |

(Continued)

FOREIGN PATENT DOCUMENTS

| | | |
|---|---|---|
| CA | 2 279 176 A1 | 7/1998 |
| DE | 10 2006 057 369 A1 | 6/2008 |

(Continued)

OTHER PUBLICATIONS

Official Communication issued in International Patent Application No. PCT/JP2011/068110, mailed on Sep. 20, 2011.

(Continued)

*Primary Examiner* — Christle I Marshall
(74) *Attorney, Agent, or Firm* — Keating & Bennett, LLP

(57) ABSTRACT

An RFIC element includes a capacitance therein. By this capacitance and an inductance of a loop-shaped conductor, an LC resonant circuit is provided. When UHF-band high-frequency power is supplied to the loop-shaped conductor from the RFIC element, the loop-shaped conductor is coupled to a flat conductor in an electromagnetic field by a current flowing through the loop-shaped conductor, and induced currents flow through the flat conductor. By propagation of the induced currents through the flat conductor, the flat conductor acts as a radiation element. It is preferred that the dimension in the longitudinal direction of the flat conductor be a half wavelength of the used frequency band. Accordingly, the flat conductor acts as a half-wave radiation element.

18 Claims, 18 Drawing Sheets

(56) References Cited

U.S. PATENT DOCUMENTS

| | | |
|---|---|---|
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |
| 5,955,723 A | 9/1999 | Reiner |
| 5,995,006 A | 11/1999 | Walsh |
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,243,045 B1 | 6/2001 | Ishibashi |
| 6,249,258 B1 | 6/2001 | Bloch et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,452,563 B1 | 9/2002 | Porte |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,812,707 B2 | 11/2004 | Yonezawa et al. |
| 6,828,881 B2 | 12/2004 | Mizutani et al. |
| 6,837,438 B1 | 1/2005 | Takasugi et al. |
| 6,861,731 B2 | 3/2005 | Buijsman et al. |
| 6,927,738 B2 | 8/2005 | Senba et al. |
| 6,956,481 B1 | 10/2005 | Cole |
| 6,963,729 B2 | 11/2005 | Uozumi |
| 7,088,249 B2 | 8/2006 | Senba et al. |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 6,104,611 A1 | 8/2008 | Lastinger |
| 8,466,791 B2 * | 6/2013 | Goto et al. ................ 340/572.7 |
| 2001/0011012 A1 | 8/2001 | Hino et al. |
| 2002/0011967 A1 | 1/2002 | Goff et al. |
| 2002/0015002 A1 | 2/2002 | Yasukawa et al. |
| 2002/0044092 A1 | 4/2002 | Kushihi |
| 2002/0067316 A1 | 6/2002 | Yokoshima et al. |
| 2002/0093457 A1 | 7/2002 | Hamada et al. |
| 2002/0186004 A1 | 12/2002 | Prazeres da Costa et al. |
| 2003/0006901 A1 | 1/2003 | Kim et al. |
| 2003/0020661 A1 | 1/2003 | Sato |
| 2003/0045324 A1 | 3/2003 | Nagumo et al. |
| 2003/0169153 A1 | 9/2003 | Muller |
| 2003/0206095 A1 | 11/2003 | Chaloner et al. |
| 2004/0001027 A1 | 1/2004 | Killen et al. |
| 2004/0026519 A1 | 2/2004 | Usami et al. |
| 2004/0056823 A1 | 3/2004 | Zuk et al. |
| 2004/0066617 A1 | 4/2004 | Hirabayashi et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2004/0252064 A1 | 12/2004 | Yuanzhu |
| 2005/0001031 A1 | 1/2005 | Akiho et al. |
| 2005/0007296 A1 | 1/2005 | Endo et al. |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0133605 A1 | 6/2005 | Koyama et al. |
| 2005/0134460 A1 | 6/2005 | Usami |
| 2005/0134506 A1 | 6/2005 | Egbert |
| 2005/0138798 A1 | 6/2005 | Sakama et al. |
| 2005/0140512 A1 | 6/2005 | Sakama et al. |
| 2005/0162331 A1 | 7/2005 | Endo et al. |
| 2005/0232412 A1 | 10/2005 | Ichihara et al. |
| 2005/0236623 A1 | 10/2005 | Takechi et al. |
| 2005/0253726 A1 | 11/2005 | Yoshida et al. |
| 2005/0275539 A1 | 12/2005 | Sakama et al. |
| 2006/0001138 A1 | 1/2006 | Sakama et al. |
| 2006/0032926 A1 | 2/2006 | Baba et al. |
| 2006/0044192 A1 | 3/2006 | Egbert |
| 2006/0055531 A1 | 3/2006 | Cook et al. |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0114159 A1 | 6/2006 | Yoshikawa et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0208900 A1 | 9/2006 | Tavassoli Hozouri |
| 2006/0214801 A1 | 9/2006 | Murofushi et al. |
| 2006/0220871 A1 | 10/2006 | Baba et al. |
| 2006/0244568 A1 | 11/2006 | Tong et al. |
| 2006/0244676 A1 | 11/2006 | Uesaka |
| 2006/0267138 A1 | 11/2006 | Kobayashi |
| 2007/0004028 A1 | 1/2007 | Lair et al. |
| 2007/0015549 A1 | 1/2007 | Hernandez et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0057854 A1 | 3/2007 | Oodachi et al. |
| 2007/0069037 A1 | 3/2007 | Kawai |
| 2007/0132591 A1 | 6/2007 | Khatri |
| 2007/0164414 A1 | 7/2007 | Dokai et al. |
| 2007/0200705 A1 | 8/2007 | Yamagajo et al. |
| 2007/0200782 A1 | 8/2007 | Hayama et al. |
| 2007/0229276 A1 | 10/2007 | Yamagajo et al. |
| 2007/0247387 A1 | 10/2007 | Kubo et al. |
| 2007/0252700 A1 | 11/2007 | Ishihara et al. |
| 2007/0252703 A1 | 11/2007 | Kato et al. |
| 2007/0252763 A1 | 11/2007 | Martin |
| 2007/0252770 A1 | 11/2007 | Kai et al. |
| 2007/0285335 A1 | 12/2007 | Bungo et al. |
| 2007/0290928 A1 | 12/2007 | Chang et al. |
| 2008/0024156 A1 | 1/2008 | Arai et al. |
| 2008/0068132 A1 | 3/2008 | Kayanakis et al. |
| 2008/0070003 A1 | 3/2008 | Nakatani et al. |
| 2008/0074268 A1 | 3/2008 | Shafer |
| 2008/0087990 A1 | 4/2008 | Kato et al. |
| 2008/0111695 A1 | 5/2008 | Yamagajo et al. |
| 2008/0129606 A1 | 6/2008 | Yanagisawa et al. |
| 2008/0143630 A1 | 6/2008 | Kato et al. |
| 2008/0169905 A1 | 7/2008 | Slatter |
| 2008/0184281 A1 | 7/2008 | Ashizaki et al. |
| 2008/0252551 A1 | 10/2008 | Kubo et al. |
| 2008/0272885 A1 | 11/2008 | Atherton |
| 2009/0002130 A1 | 1/2009 | Kato |
| 2009/0008460 A1 | 1/2009 | Kato |
| 2009/0009007 A1 | 1/2009 | Kato et al. |
| 2009/0021352 A1 | 1/2009 | Kataya et al. |
| 2009/0021446 A1 | 1/2009 | Kataya et al. |
| 2009/0065594 A1 | 3/2009 | Kato et al. |
| 2009/0066466 A1 | 3/2009 | Arimura |
| 2009/0080296 A1 | 3/2009 | Dokai et al. |
| 2009/0096696 A1 | 4/2009 | Joyce, Jr. et al. |
| 2009/0109034 A1 | 4/2009 | Chen et al. |
| 2009/0109102 A1 | 4/2009 | Dokai et al. |
| 2009/0134979 A1 | 5/2009 | Tsukamoto et al. |
| 2009/0140947 A1 | 6/2009 | Sasagawa et al. |
| 2009/0160719 A1 | 6/2009 | Kato et al. |
| 2009/0201116 A1 | 8/2009 | Orihara |
| 2009/0224061 A1 | 9/2009 | Kato et al. |
| 2009/0231106 A1 | 9/2009 | Okamura |
| 2009/0262041 A1 | 10/2009 | Ikemoto et al. |
| 2009/0266900 A1 | 10/2009 | Ikemoto et al. |
| 2009/0278687 A1 | 11/2009 | Kato |
| 2009/0284220 A1 | 11/2009 | Toncich et al. |
| 2009/0321527 A1 | 12/2009 | Kato et al. |
| 2010/0103058 A1 | 4/2010 | Kato et al. |
| 2010/0182210 A1 | 7/2010 | Ryou et al. |
| 2010/0283694 A1 | 11/2010 | Kato |

(56) References Cited

U.S. PATENT DOCUMENTS

| | | |
|---|---|---|
| 2010/0308118 A1 | 12/2010 | Kataya et al. |
| 2011/0031320 A1 | 2/2011 | Kato et al. |
| 2011/0063184 A1 | 3/2011 | Furumura et al. |
| 2011/0080331 A1 | 4/2011 | Kato |
| 2011/0186641 A1 | 8/2011 | Kato et al. |
| 2011/0253795 A1 | 10/2011 | Kato |
| 2012/0001701 A1 | 1/2012 | Taniguchi et al. |
| 2012/0208606 A1* | 8/2012 | Kubo et al. ............ 455/575.7 |
| 2012/0306714 A1* | 12/2012 | Yosui et al. ............... 343/788 |
| 2013/0002404 A1* | 1/2013 | Takeoka et al. ........... 340/10.1 |
| 2013/0147675 A1* | 6/2013 | Kato et al. ................. 343/788 |

FOREIGN PATENT DOCUMENTS

| | | |
|---|---|---|
| EP | 0 694 874 A2 | 1/1996 |
| EP | 0 848 448 A2 | 6/1998 |
| EP | 0 948 083 A2 | 10/1999 |
| EP | 0 977 145 A2 | 2/2000 |
| EP | 1 010 543 A1 | 6/2000 |
| EP | 1 085 480 A1 | 3/2001 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 547 753 A1 | 6/2005 |
| EP | 1 548 872 A1 | 6/2005 |
| EP | 1 626 364 A2 | 2/2006 |
| EP | 1 701 296 A1 | 9/2006 |
| EP | 1 703 589 A1 | 9/2006 |
| EP | 1 742 296 A1 | 1/2007 |
| EP | 1 744 398 A1 | 1/2007 |
| EP | 1 840 802 A1 | 10/2007 |
| EP | 1 841 005 A1 | 10/2007 |
| EP | 1 865 574 A1 | 12/2007 |
| EP | 1 887 652 A1 | 2/2008 |
| EP | 1 976 056 A1 | 10/2008 |
| EP | 1 988 491 A1 | 11/2008 |
| EP | 1 988 601 A1 | 11/2008 |
| EP | 1 993 170 A1 | 11/2008 |
| EP | 2 009 738 A1 | 12/2008 |
| EP | 2 012 258 A1 | 1/2009 |
| EP | 2 096 709 A1 | 9/2009 |
| EP | 2 148 449 A1 | 1/2010 |
| EP | 2 166 617 A1 | 3/2010 |
| EP | 2 251 934 A1 | 11/2010 |
| EP | 2 256 861 A1 | 12/2010 |
| EP | 2 330 684 A1 | 6/2011 |
| GB | 2 305 075 A | 3/1997 |
| GB | 2461443 A | 1/2010 |
| GB | 2470299 A | 11/2010 |
| JP | 50-143451 A | 11/1975 |
| JP | 61-284102 A | 12/1986 |
| JP | 62-127140 U | 8/1987 |
| JP | 01-212035 A | 8/1989 |
| JP | 02-164105 A | 6/1990 |
| JP | 02-256208 A | 10/1990 |
| JP | 3-171385 A | 7/1991 |
| JP | 03-503467 A | 8/1991 |
| JP | 03-262313 A | 11/1991 |
| JP | 04-150011 A | 5/1992 |
| JP | 04-167500 A | 6/1992 |
| JP | 04-096814 U | 8/1992 |
| JP | 04-101168 U | 9/1992 |
| JP | 04-134807 U | 12/1992 |
| JP | 05-226926 A | 9/1993 |
| JP | 05-327331 A | 12/1993 |
| JP | 6-53733 A | 2/1994 |
| JP | 06-077729 A | 3/1994 |
| JP | 06-029215 U | 4/1994 |
| JP | 06-177635 A | 6/1994 |
| JP | 6-260949 A | 9/1994 |
| JP | 07-183836 A | 7/1995 |
| JP | 08-055725 A | 2/1996 |
| JP | 08-056113 A | 2/1996 |
| JP | 8-87580 A | 4/1996 |
| JP | 08-88586 A | 4/1996 |
| JP | 08-088586 A | 4/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 09-093029 A | 4/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 09-284038 A | 10/1997 |
| JP | 09-294374 A | 11/1997 |
| JP | 9-512367 A | 12/1997 |
| JP | 10-69533 A | 3/1998 |
| JP | 10-069533 A | 3/1998 |
| JP | 10-084406 A | 3/1998 |
| JP | 10-505466 A | 5/1998 |
| JP | 10-171954 A | 6/1998 |
| JP | 10-173427 A | 6/1998 |
| JP | 10-193849 A | 7/1998 |
| JP | 10-193851 A | 7/1998 |
| JP | 10-242742 A | 9/1998 |
| JP | 10-293828 A | 11/1998 |
| JP | 10-334203 A | 12/1998 |
| JP | 11-025244 A | 1/1999 |
| JP | 11-039441 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149537 A | 6/1999 |
| JP | 11-149538 A | 6/1999 |
| JP | 11-175678 A | 7/1999 |
| JP | 11-219420 A | 8/1999 |
| JP | 11-220319 A | 8/1999 |
| JP | 11-282993 A | 10/1999 |
| JP | 11-328352 A | 11/1999 |
| JP | 11-331014 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2000-048152 A | 2/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2000-349680 A | 12/2000 |
| JP | 2001-10264 A | 1/2001 |
| JP | 2001-028036 A | 1/2001 |

(56) References Cited

FOREIGN PATENT DOCUMENTS

| | | |
|---|---|---|
| JP | 2001-043340 A | 2/2001 |
| JP | 3075400 U | 2/2001 |
| JP | 2001-66990 A | 3/2001 |
| JP | 2001-76111 A | 3/2001 |
| JP | 2001-084463 A | 3/2001 |
| JP | 2001-101369 A | 4/2001 |
| JP | 2001-505682 A | 4/2001 |
| JP | 2001-168628 A | 6/2001 |
| JP | 2001/188890 A | 7/2001 |
| JP | 2001-188890 A | 7/2001 |
| JP | 2001-209767 A | 8/2001 |
| JP | 2001-240046 A | 9/2001 |
| JP | 2001-240217 A | 9/2001 |
| JP | 2001-256457 A | 9/2001 |
| JP | 2001-257292 A | 9/2001 |
| JP | 2001-514777 A | 9/2001 |
| JP | 2001-291181 A | 10/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2001-358527 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-042083 A | 2/2002 |
| JP | 2002-063557 A | 2/2002 |
| JP | 2002-505645 A | 2/2002 |
| JP | 2002-076750 A | 3/2002 |
| JP | 2002-76750 A | 3/2002 |
| JP | 2002-111363 A | 4/2002 |
| JP | 2002-143826 A | 5/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-175920 A | 6/2002 |
| JP | 2002-183676 A | 6/2002 |
| JP | 2002-183690 A | 6/2002 |
| JP | 2002-185358 A | 6/2002 |
| JP | 2002-204117 A | 7/2002 |
| JP | 2002-521757 A | 7/2002 |
| JP | 2002-522849 A | 7/2002 |
| JP | 2002-222398 A | 8/2002 |
| JP | 2002-230128 A | 8/2002 |
| JP | 2002-232221 A | 8/2002 |
| JP | 2002-245416 A | 8/2002 |
| JP | 2002-246828 A | 8/2002 |
| JP | 2002-252117 A | 9/2002 |
| JP | 2002-259934 A | 9/2002 |
| JP | 2002-280821 A | 9/2002 |
| JP | 2002-290130 A | 10/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-324221 A | 11/2002 |
| JP | 2002-325013 A | 11/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-037861 A | 2/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099184 A | 4/2003 |
| JP | 2003-099720 A | 4/2003 |
| JP | 2003-099721 A | 4/2003 |
| JP | 2003-108966 A | 4/2003 |
| JP | 2003-110344 A | 4/2003 |
| JP | 2003-132330 A | 5/2003 |
| JP | 2003-134007 A | 5/2003 |
| JP | 2003-139866 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-308363 A | 10/2003 |
| JP | 2003-309418 A | 10/2003 |
| JP | 2003-317055 A | 11/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-096618 A | 3/2004 |
| JP | 2004-506905 A | 3/2004 |
| JP | 2004-104344 A | 4/2004 |
| JP | 2004-121412 A | 4/2004 |
| JP | 2004-126750 A | 4/2004 |
| JP | 2004-127230 A | 4/2004 |
| JP | 2004-140513 A | 5/2004 |
| JP | 2004-145449 A | 5/2004 |
| JP | 2004-163134 A | 6/2004 |
| JP | 2004-166175 A | 6/2004 |
| JP | 2004-166176 A | 6/2004 |
| JP | 2004-172919 A | 6/2004 |
| JP | 2004-213582 A | 7/2004 |
| JP | 2004-519916 A | 7/2004 |
| JP | 2004/070879 A | 8/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-295297 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |

(56) References Cited

FOREIGN PATENT DOCUMENTS

| | | |
|---|---|---|
| JP | 2004-334268 A | 11/2004 |
| JP | 2004-336250 A | 11/2004 |
| JP | 2004-336604 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-006096 A | 1/2005 |
| JP | 2005-18156 A | 1/2005 |
| JP | 2005-033461 A | 2/2005 |
| JP | 2005-050581 A | 2/2005 |
| JP | 2005-064799 A | 3/2005 |
| JP | 2005-124061 A | 5/2005 |
| JP | 2005-128592 A | 5/2005 |
| JP | 2005-129019 A | 5/2005 |
| JP | 2005-134942 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-202943 A | 7/2005 |
| JP | 2005-204038 A | 7/2005 |
| JP | 2005-210223 A | 8/2005 |
| JP | 2005-210676 A | 8/2005 |
| JP | 2005-210680 A | 8/2005 |
| JP | 2005-217822 A | 8/2005 |
| JP | 2005-229474 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-277579 A | 10/2005 |
| JP | 2005-284352 A | 10/2005 |
| JP | 2005-284455 A | 10/2005 |
| JP | 2005-293537 A | 10/2005 |
| JP | 2005-295135 A | 10/2005 |
| JP | 2005-306696 A | 11/2005 |
| JP | 2005-311205 A | 11/2005 |
| JP | 2005-321305 A | 11/2005 |
| JP | 2005-322119 A | 11/2005 |
| JP | 2005-327622 A | 11/2005 |
| JP | 2005-328259 A | 11/2005 |
| JP | 2005-333244 A | 12/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-13976 A | 1/2006 |
| JP | 2006-013976 A | 1/2006 |
| JP | 2006-025390 A | 1/2006 |
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-050200 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-238282 A | 9/2006 |
| JP | 2006-246372 A | 9/2006 |
| JP | 2006-270212 A | 10/2006 |
| JP | 2006-270681 A | 10/2006 |
| JP | 2006-270766 A | 10/2006 |
| JP | 2006-285911 A | 10/2006 |
| JP | 2006-287659 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-013120 A | 1/2007 |
| JP | 2007-13120 A | 1/2007 |
| JP | 2007-18067 A | 1/2007 |
| JP | 2007-019905 A | 1/2007 |
| JP | 2007-28002 A | 2/2007 |
| JP | 2007-028002 A | 2/2007 |
| JP | 2007-040702 A | 2/2007 |
| JP | 2007-043535 A | 2/2007 |
| JP | 2007-048126 A | 2/2007 |
| JP | 2007-65822 A | 3/2007 |
| JP | 2007-068073 A | 3/2007 |
| JP | 2007-79687 A | 3/2007 |
| JP | 2007-81712 A | 3/2007 |
| JP | 2007-096655 A | 4/2007 |
| JP | 2007-096768 A | 4/2007 |
| JP | 2007-102348 A | 4/2007 |
| JP | 2007-116347 A | 5/2007 |
| JP | 2007-122542 A | 5/2007 |
| JP | 2007-149757 A | 6/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 3975918 B2 | 6/2007 |
| JP | 2007-172369 A | 7/2007 |
| JP | 2007-172527 A | 7/2007 |
| JP | 2007-194924 A | 8/2007 |
| JP | 2007-524942 A | 8/2007 |
| JP | 2007-228254 A | 9/2007 |
| JP | 2007-228325 A | 9/2007 |
| JP | 2007-228437 A | 9/2007 |
| JP | 2007-233597 A | 9/2007 |
| JP | 2007-241789 A | 9/2007 |
| JP | 2007-249620 A | 9/2007 |
| JP | 2007-266999 A | 10/2007 |
| JP | 2007-272264 A | 10/2007 |
| JP | 2007-279782 A | 10/2007 |
| JP | 2007-287128 A | 11/2007 |
| JP | 2007-295177 A | 11/2007 |
| JP | 2007-295395 A | 11/2007 |
| JP | 2007-295557 A | 11/2007 |
| JP | 2007-312350 A | 11/2007 |
| JP | 2007-324865 A | 12/2007 |
| JP | 2008-033716 A | 2/2008 |
| JP | 2008-042910 A | 2/2008 |
| JP | 2008-72243 A | 3/2008 |
| JP | 2008-083867 A | 4/2008 |
| JP | 2008-092131 A | 4/2008 |
| JP | 2008-097426 A | 4/2008 |
| JP | 2008-098993 A | 4/2008 |
| JP | 4069958 B2 | 4/2008 |
| JP | 2008-103691 A | 5/2008 |
| JP | 2008-107947 A | 5/2008 |
| JP | 2008-118359 A | 5/2008 |
| JP | 2008-513888 A | 5/2008 |

(56) References Cited

FOREIGN PATENT DOCUMENTS

| | | |
|---|---|---|
| JP | 2008-148345 A | 6/2008 |
| JP | 2008-519347 A | 6/2008 |
| JP | 2008-160821 A | 7/2008 |
| JP | 2008-160874 A | 7/2008 |
| JP | 2008-167190 A | 7/2008 |
| JP | 2008-182438 A | 8/2008 |
| JP | 2008-197714 A | 8/2008 |
| JP | 2008-535372 A | 8/2008 |
| JP | 2008-207875 A | 9/2008 |
| JP | 2008-211572 A | 9/2008 |
| JP | 2008-217406 A | 9/2008 |
| JP | 2008-226099 A | 9/2008 |
| JP | 2008-244739 A | 10/2008 |
| JP | 2008-252517 A | 10/2008 |
| JP | 2008-288915 A | 11/2008 |
| JP | 2008-294491 A | 12/2008 |
| JP | 2009-017284 A | 1/2009 |
| JP | 2009-021970 A | 1/2009 |
| JP | 2009-25870 A | 2/2009 |
| JP | 2009-027291 A | 2/2009 |
| JP | 2009-27291 A | 2/2009 |
| JP | 2009-037413 A | 2/2009 |
| JP | 2009-044647 A | 2/2009 |
| JP | 2009-044715 A | 2/2009 |
| JP | 3148168 U | 2/2009 |
| JP | 2009-065426 A | 3/2009 |
| JP | 2009-110144 A | 5/2009 |
| JP | 2009-111986 A | 5/2009 |
| JP | 2009-130896 A | 6/2009 |
| JP | 2009-135166 A | 6/2009 |
| JP | 2009-524363 A | 6/2009 |
| JP | 2009-153166 A | 7/2009 |
| JP | 4301346 B2 | 7/2009 |
| JP | 2009-181246 A | 8/2009 |
| JP | 2009-182630 A | 8/2009 |
| JP | 2009-213169 A | 9/2009 |
| JP | 2009-213171 A | 9/2009 |
| JP | 2009-260758 A | 11/2009 |
| JP | 2009-278441 A | 11/2009 |
| JP | 2009-284182 A | 12/2009 |
| JP | 2010-009196 A | 1/2010 |
| JP | 2010-015342 A | 1/2010 |
| JP | 2010-504598 A | 2/2010 |
| JP | 2010-050844 A | 3/2010 |
| JP | 2010-051012 A | 3/2010 |
| JP | 2010-051017 A | 3/2010 |
| JP | 2010-074839 A | 4/2010 |
| JP | 2010-081571 | 4/2010 |
| JP | 2010-171857 A | 8/2010 |
| JP | 4535209 B2 | 9/2010 |
| JP | 4561932 B2 | 10/2010 |
| JP | 2010-268306 A | 11/2010 |
| JP | 2011-015395 A | 1/2011 |
| JP | 4609604 B2 | 1/2011 |
| JP | 2011-076567 A | 4/2011 |
| JP | 2011-139533 A | 7/2011 |
| JP | 2011-205384 A | 10/2011 |
| JP | 2012-033021 A | 2/2012 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A2 | 4/2004 |
| WO | 2004/070879 A | 8/2004 |
| WO | 2004/072892 A2 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/049068 A1 | 5/2006 |
| WO | 2006/114821 A1 | 11/2006 |
| WO | 2007/013168 A1 | 2/2007 |
| WO | 2007/060792 A1 | 5/2007 |
| WO | 2007/083574 A1 | 7/2007 |
| WO | 2007/083575 A1 | 7/2007 |
| WO | 2007/086130 A1 | 8/2007 |
| WO | 2007/094494 A1 | 8/2007 |
| WO | 2007/097385 A1 | 8/2007 |
| WO | 2007/099602 A1 | 9/2007 |
| WO | 2007/100092 A1 | 9/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/132094 A1 | 11/2007 |
| WO | 2007/138857 A1 | 12/2007 |
| WO | 2008/001561 A1 | 1/2008 |
| WO | 2008/007606 A | 1/2008 |
| WO | 2008/081699 A1 | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/005080 A1 | 1/2009 |
| WO | 2009/008296 A1 | 1/2009 |
| WO | 2009/011144 A1 | 1/2009 |
| WO | 2009/011154 A1 | 1/2009 |
| WO | 2009/011376 A1 | 1/2009 |
| WO | 2009/011400 A1 | 1/2009 |
| WO | 2009/011423 A1 | 1/2009 |
| WO | 2009/048767 A1 | 4/2009 |
| WO | 2009/081719 A1 | 7/2009 |
| WO | 2009/110381 A1 | 9/2009 |
| WO | 2009/119548 A1 | 10/2009 |
| WO | 2009/128437 A1 | 10/2009 |
| WO | 2009/140220 A1 | 11/2009 |
| WO | 2009/142114 A1 | 11/2009 |
| WO | 2010/026939 A1 | 3/2010 |
| WO | 2010/050361 A1 | 5/2010 |
| WO | 2010/079830 A1 | 7/2010 |
| WO | 2010/104179 A1 | 9/2010 |
| WO | 2010/119854 A1 | 10/2010 |
| WO | 2011/062274 A1 | 5/2011 |

OTHER PUBLICATIONS

Dokai et al.: "Antenna and Wireless Communication Device"; U.S. Appl. No. 13/613,021, filed Sep. 13, 2012.
Takeoka et al.: "Printed Wiring Board and Wireless Communication System"; U.S. Appl. No. 13/616,140, filed Sep. 14, 2012.
Dokai: "Wireless IC Device, Wireless IC Module and Method of Manufacturing Wireless IC Module"; U.S. Appl. No. 13/688,287, filed Nov. 29, 2012.
Official Communication issued in International Patent Application No. PCT/JP2011/067127, mailed on Oct. 18, 2011.
Kato et al.: "Wireless Communication Device and Metal Article"; U.S. Appl. No. 13/691,996, filed Dec. 3, 2012.
Yosui: "Antenna Apparatus and Communication Terminal Instrument"; U.S. Appl. No. 13/706,409, filed Dec. 6, 2012.
Official Communication issued in International Patent Application No. PCT/JP2011/071795, mailed on Dec. 27, 2011.
Dokai et al.: "Wireless IC Device"; U.S. Appl. No. 13/738,143, filed Jan. 10, 2013.
Official Communication issued in International Patent Application No. PCT/JP2011/074009, mailed on Dec. 20, 2011.
Kato et al.: "Electromagnetic-Coupling-Module-Attached Article"; U.S. Appl. No. 13/754,972, filed Jan. 31, 2013.
Kimura et al.: "Electrical Product"; U.S. Appl. No. 13/757,991, filed Feb. 4, 2013.
Nakano et al.: "Communication Terminal Device"; U.S. Appl. No. 13/760,196, filed Feb. 6, 2013.
Official Communication issued in International Patent Application No. PCT/JP2011/073054, mailed on Dec. 20, 2011.
Official Communication issued in International Patent Application No. PCT/JP2011/073490, mailed on Jan. 10, 2012.

(56) References Cited

OTHER PUBLICATIONS

Kato et al.: "Antenna Device and Communication Terminal Apparatus"; U.S. Appl. No. 13/761,195, filed Feb. 7, 2013.
Kato et al.: "Antenna Device and Mobile Communication Terminal"; U.S. Appl. No. 13/767,960, filed Feb. 15, 2013.
Official Communication issued in International Patent Application No. PCT/JP2012/058884, mailed on Jun. 12, 2012.
Dokai et al.: "Wireless Communication Device"; U.S. Appl. No. 13/782,346, filed Mar. 1, 2013.
Official Communication issued in International Patent Application No. PCT/JP2012/053344, mailed on May 22, 2012.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFRD by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed Jul. 13, 2010.
Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.

Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2012/050557, mailed on Apr. 10, 2012.
Kimura et al.: "Wireless Communication Device"; U.S. Appl. No. 13/789,761, filed Mar. 8, 2013.
Dokai et al.: "RFID Chip Package and RFID Tag"; U.S. Appl. No. 13/792,650, filed Mar. 11, 2013.
Kato et al.: "Wireless IC Device Component and Wireless IC Device"; U.S. Appl. No. 13/794,929, filed Mar. 12, 2013.
Kato et al.: "Wireless IC Device and Component for Wireless IC Device"; U.S. Appl. No. 13/848,748, filed Mar. 22, 2013.
Official Communication issued in International Patent Application No. PCT/JP2012/080493, mailed on Dec. 25, 2012.
Mukai et al.: "Inspection Method and Inspection Device for RFID Tag"; U.S. Appl. No. 13/933,184, filed Jul. 2, 2013.
Kato et al.: "Antenna Device and Method of Setting Resonant Frequency of Antenna Device"; U.S. Appl. No. 13/941,760, filed Jul. 15, 2013.
Kato et al.: "Antenna Device and Method of Setting Resonant Frequency of Antenna Device"; U.S. Appl. No. 13/943,973, filed Jul. 17, 2013.
Official Communication issued in International Patent Application No. PCT/JP2012/080700, mailed on Jan. 15, 2013.
Mukai et al.: "Wireless Integrated Circuit Device and Method of Manufacturing the Same"; U.S. Appl. No. 13/961,995, filed Aug. 8, 2013.
Kato et al.: "Radio IC Device"; U.S. Appl. No. 13/964,234, filed Aug. 12, 2013.
Official Communication issued in International Patent Application No. PCT/JP2012/067779, mailed on Aug. 28, 2012.
Official Communication issued in International Patent Application No. PCT/JP2013/051254, mailed on Apr. 2, 2013.
Dokai: "Wireless Communication Device"; U.S. Appl. No. 13/970,633, filed Aug. 20, 2013.
Official Communication issued in International Patent Application No. PCT/JP2012/059350, mailed on Jul. 3, 2012.
Dokai: "Wireless IC Device"; U.S. Appl. No. 14/011,823, filed Aug. 28, 2013.
Official Communication issued in International Patent Application No. PCT/JP2012/055505, mailed on Jun. 5, 2012.
Kato: "Radio IC Device and Radio Communication Terminal"; U.S. Appl. No. 14/017,406, filed Sep. 4, 2013.
Official Communication issued in International Patent Application No. PCT/JP2012/067454, mailed on Aug. 7, 2012.
Kato: "Antenna Device and Communication Terminal Apparatus"; U.S. Appl. No. 14/019,573, filed Sep. 6, 2013.
Official Communication issued in International Patent Application No. PCT/JP2012/067537, mailed on Oct. 9, 2012.
Kato: "Radio Communication Device"; U.S. Appl. No. 14/027,384, filed Sep. 16, 2013.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.

(56) References Cited

OTHER PUBLICATIONS

Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
ITO: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed Mar. 25, 2008.
Osamura et al.: "Packaging Material with Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.

Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.

(56) References Cited

OTHER PUBLICATIONS

Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.

Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126, Nov. 8, 2005.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl, No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader"; U.S. Application No. 13/437,978, filed Apr. 3, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Kato: "Wireless IC Device"; U.S. Appl. No. 12/789,610, filed May 28, 2010.
Kato: "Antenna and RFID Device"; U.S. Appl. No. 13/472,520, filed May 16, 2012.
Kato et al.: "Wireless IC Device and Component for Wireless IC Device"; U.S. Appl. No. 13/540,694, filed Jul. 3, 2012.
Dokai et al.: "Wireless IC Device and Component for Wireless IC Device"; U.S. Appl. No. 13/567,108, filed Aug. 6, 2012.
Dokai et al.: "Wireless IC Device and Component for Wireless Device"; U.S. Appl. No. 13/567,109, filed Aug. 6, 2012.
Official Communication issued in International Patent Application No. PCT/JP2011/052594, mailed on May 17, 2011.
Kato et al.: "Wireless IC Device"; U.S. Appl. No. 13/585,866, filed Aug. 15, 2012.
Kato et al.: "Radio Communication Device and Radio Communication Terminal"; U.S. Appl. No. 13/600,256, filed Aug. 31, 2012.
Murayama et al.: "Wireless Communication Module and Wireless Communication Device"; U.S. Appl. No. 13/598,872, filed Aug. 30, 2012.
Official Communication issued in International Patent Application No. PCT/JP2011/069689, mailed on Oct. 4, 2011.
Official Communication issued in corresponding Japanese Patent Application No. 2011-552116, mailed on Apr. 17, 2012.
Tsubaki et al.: "RFID Module and RFID Device"; U.S. Appl. No. 13/603,627, filed Sep. 5, 2012.
Kato et al.: "Antenna Device and Method of Setting Resonant Frequency of Antenna Device"; U.S. Appl. No. 13/604,807, filed Sep. 6, 2012.
Kato et al.: "Antenna Device and Method of Setting Resonant Frequency of Antenna Device"; U.S. Appl. No. 13/604,801, filed Sep. 6, 2012.
Official Communication issued in International Patent Application No. PCT/JP2011/053656, mailed on May 17, 2011.

* cited by examiner

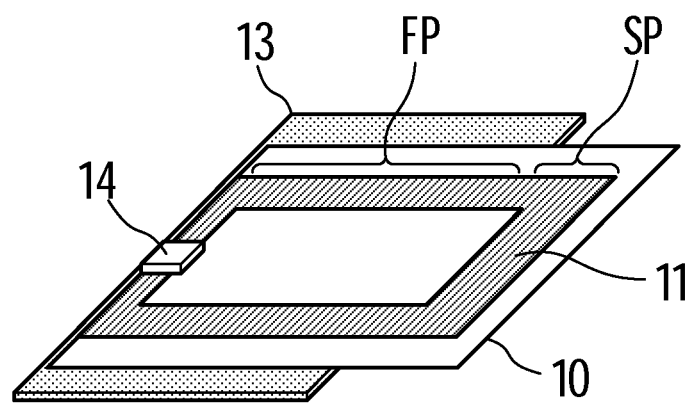
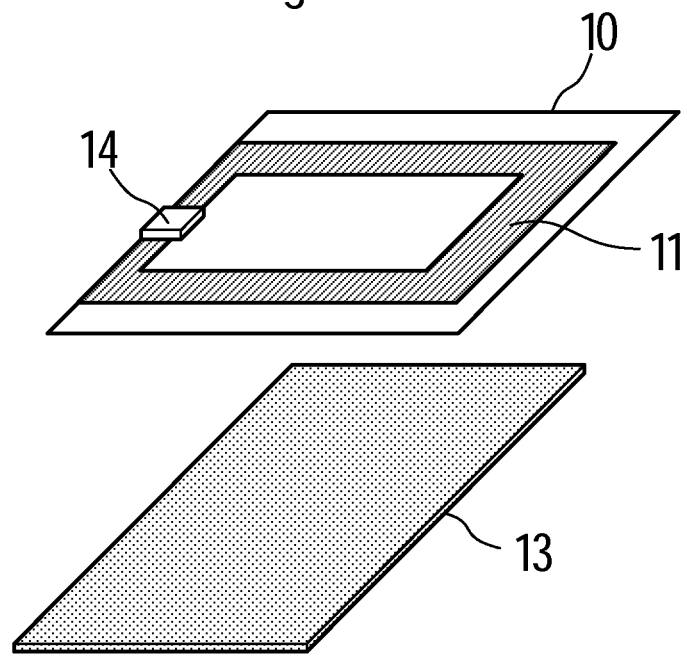

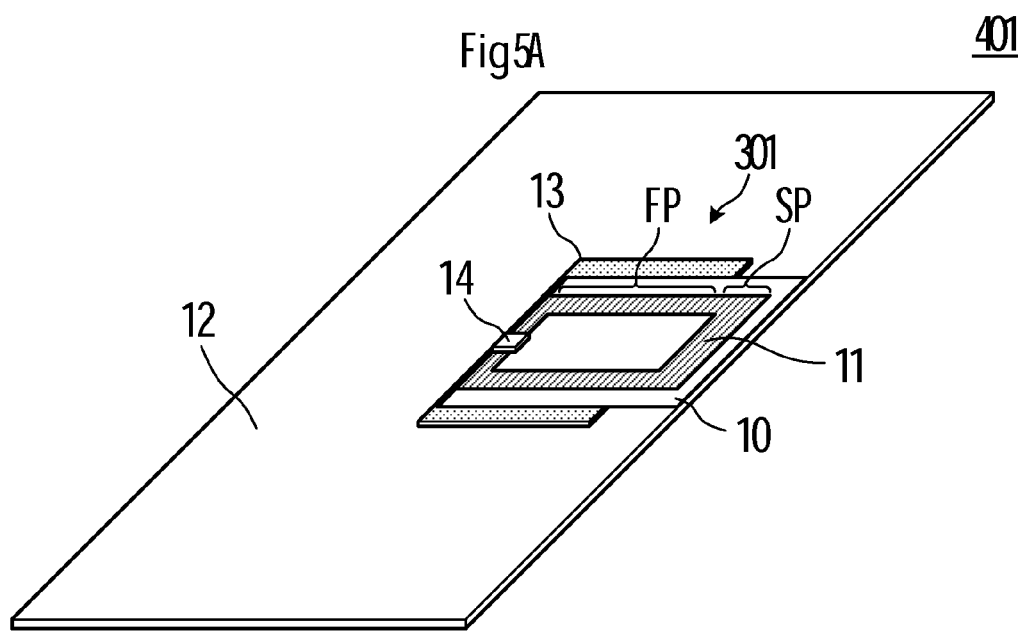
Fig 5A
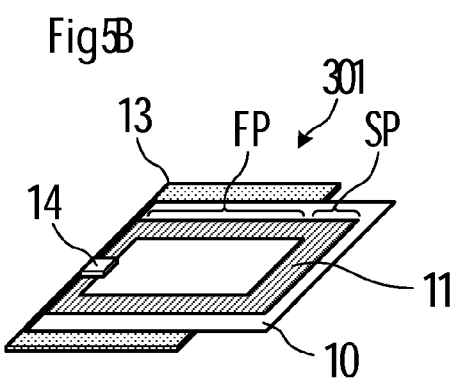
Fig 5B
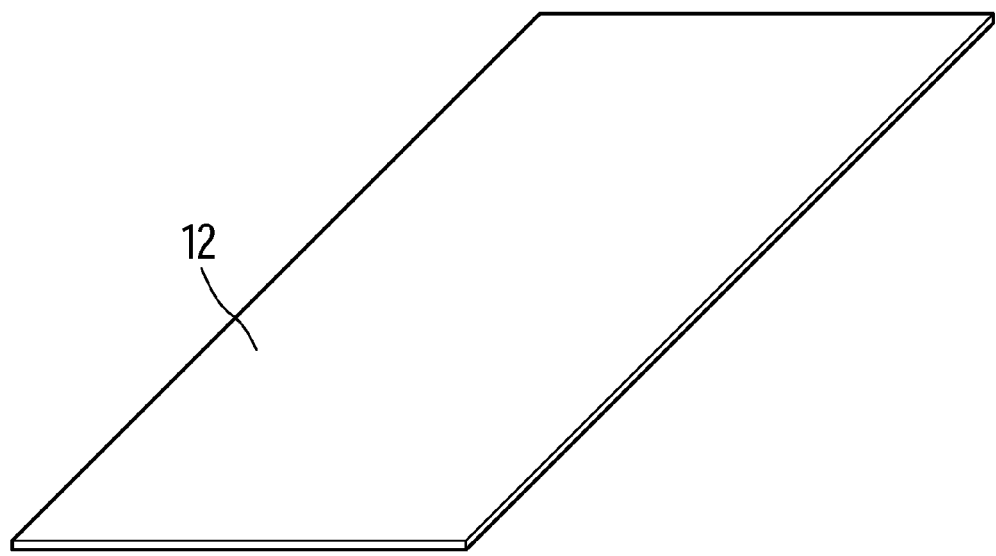

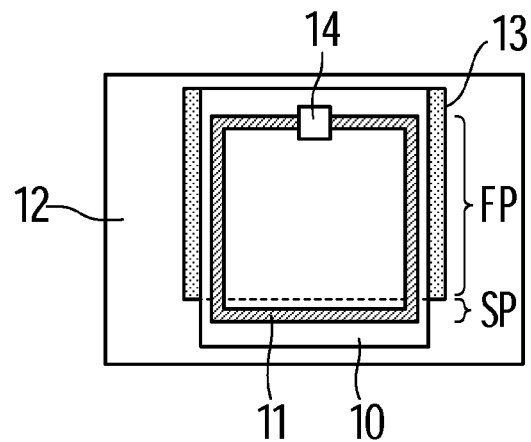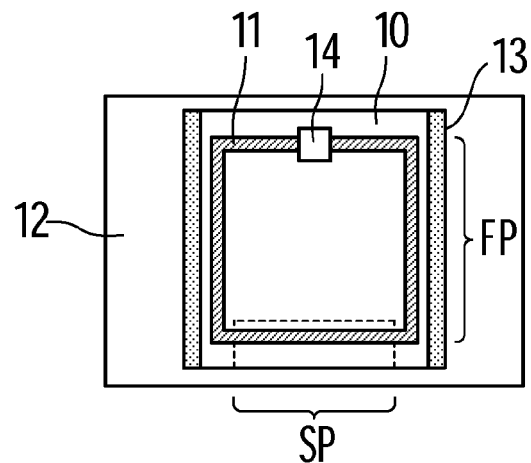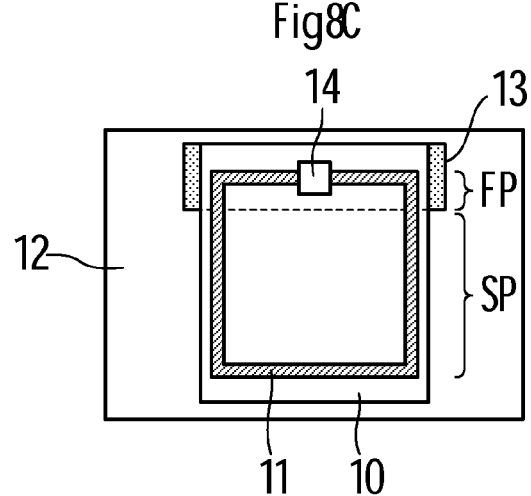

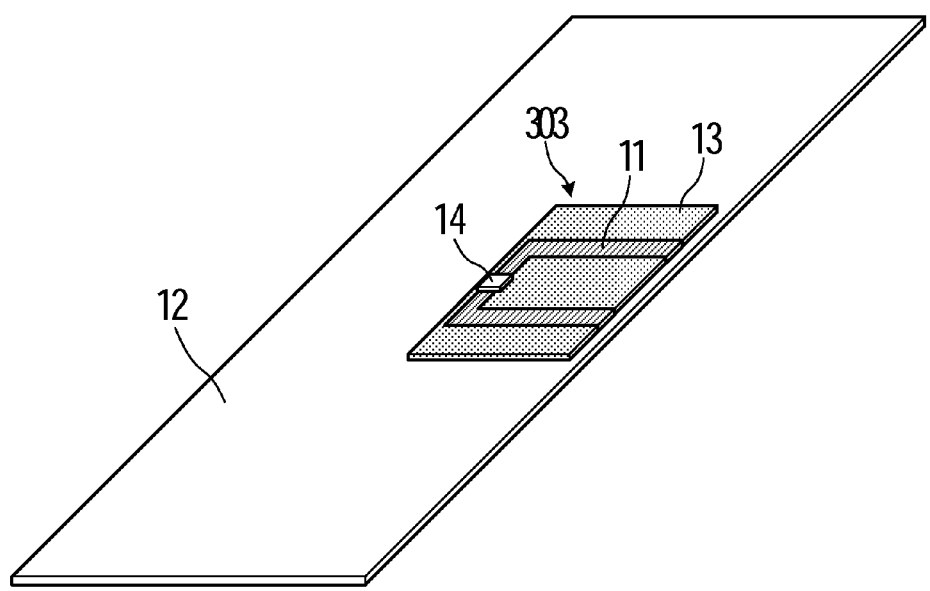

ANTENNA DEVICE, RFID TAG, AND COMMUNICATION TERMINAL APPARATUS

BACKGROUND OF THE INVENTION

1. Field of the Invention

The present invention relates to an antenna device, an RFID tag, and a communication terminal apparatus which are preferably used for near field communication.

2. Description of the Related Art

An RFID system in which a reader/writer and an RFID (Radio Frequency Identification) tag communicate with each other by a contactless scheme to transmit information between the reader/writer and the RFID tag is proliferating. For RFID systems, an HF-band RFID system using the 13 MHz band and a UHF-band RFID system using the 900 MHz band are commonly used. In particular, for an RFID system for item management, a UHF-band RFID system is a promising system in terms of its long communication distance and capability to perform reading and writing multiple tags at a time.

An RFID tag used in an RFID system includes an RFIC chip for processing radio signals and an antenna element for transmitting and receiving radio signals. An RFID tag for the UHF band uses a dipole antenna or a loop antenna as an antenna element. In particular, the loop antenna is useful as an antenna for a compact RFID tag because, although it is a magnetic field radiation type antenna and thus has a slightly short communication distance, it can achieve miniaturization.

In the case of using a loop antenna, in a situation in which an open surface of the loop antenna faces a metal body, if an affixation target item is a metal body, for example, eddy current that cancels out magnetic field changes in the loop antenna is generated in the metal body, which makes it difficult to secure a sufficient communication distance.

To solve the problem of eddy current, as described in, for example, Japanese Patent Unexamined Publication No. 2004-166175 bulletin or the like, there is known a technique for interposing a magnetic material such as ferrite between a loop antenna and an affixation target.

FIG. 1A is a perspective view of an antenna for a reader/writer shown in Japanese Patent Unexamined Publication No. 2004-166175 bulletin, and FIG. 1B is a cross-sectional view of an A-A' portion of FIG. 1A. In the antenna for a reader/writer, a soft magnetic material 5 is disposed between an antenna coil 4 whose both ends are connected to an electronic circuit 8 and a metal surface 6. As shown in FIG. 1B, magnetic fluxes 9 generated in the antenna coil 4 pass through the soft magnetic material 5 and do not reach the inside of the metal surface 6 almost at all. Thus, a change in resonance frequency and an increase in loss caused by eddy current generated in the metal surface 6 are suppressed.

However, in the antenna having the structure shown in FIGS. 1A and 1B, it is difficult to sufficiently block entry of magnetic fluxes into a metal body, depending on the used frequency band, the thickness of the magnetic material, or the like. That is, to suppress the influence of the metal body, the magnetic material needs to be thickened, which in turn increases the sizes of an antenna device and an apparatus including the antenna device.

SUMMARY OF THE INVENTION

Preferred embodiments of the present invention provide an antenna device, an RFID tag, and a communication terminal apparatus that suppress or prevent an increase in loss and a change in resonance frequency caused by eddy current generated in a metal surface, without increasing size.

An antenna device according to a preferred embodiment of the present invention includes an antenna module including a loop-shaped conductor to which a feed circuit is connected or coupled, and a magnetic sheet parallel or substantially parallel to the loop-shaped conductor; and a flat conductor disposed so as to face the antenna module, and having an area larger than the loop-shaped conductor, wherein the loop-shaped conductor includes a first portion facing the flat conductor with the magnetic sheet therebetween, and a second portion directly electrically connected or coupled in an electromagnetic field to the flat conductor without the magnetic sheet therebetween, the loop-shaped conductor includes a feed point connected or coupled to the feed circuit, and a current maximum point spaced away from the feed point, and the second portion is a region including the current maximum point, the loop-shaped conductor is disposed close to the flat conductor such that a surface defined by the loop-shaped conductor extends along a surface of the flat conductor, and the loop-shaped conductor is disposed at a location where the second portion is closer to an end edge portion side of the flat conductor than the center of the flat conductor.

With this configuration, when predetermined power is supplied from the feed circuit to the loop-shaped conductor, a portion of a current flowing through the loop-shaped conductor is guided to the flat conductor through the second portion. By propagation of this current through the flat conductor, the flat conductor acts as a radiation element.

It is preferred that the second portion of the loop-shaped conductor be linear, and the loop-shaped conductor be disposed to be parallel or substantially parallel to a linear end edge portion of the flat conductor.

In the antenna device of one of the preferred embodiments of the present invention described above, it is preferred that the flat conductor be a ground conductor located on a printed wiring board.

An RFID tag according to a preferred embodiment of the present invention includes the antenna device according to any one of the above-described preferred embodiments of the present invention, and an RFIC element directly connected or coupled in an electromagnetic field to the loop-shaped conductor.

A communication terminal apparatus according to a preferred embodiment of the present invention includes the antenna device according to any one of the above-described preferred embodiments of the present invention, and an RFIC element directly connected or coupled in an electromagnetic field to the loop-shaped conductor.

It is preferred that the flat conductor be a ground conductor located on a printed wiring board.

It is also preferred that the RFIC element be used in a UHF-band RFID system where the RFIC element achieves matching with the loop-shaped conductor in a UHF band, for example.

According to various preferred embodiments of the present invention, an antenna device, an RFID tag, a communication terminal apparatus, or the like, suppress or prevent an increase in loss and a change in resonance frequency caused by eddy current generated in a metal surface, without increasing size.

The above and other elements, features, steps, characteristics and advantages of the present invention will become more apparent from the following detailed description of the preferred embodiments with reference to the attached drawings.

BRIEF DESCRIPTION OF THE DRAWINGS

2004-166175 bulletin.

FIG. 3A is a perspective view of an RFID tag 301, and FIG. 3B is an exploded perspective view thereof.

FIG. 5A is a perspective view of a communication terminal apparatus 401, and FIG. 5B is an exploded perspective view thereof.

FIG. 8A is a diagram showing an example of a second preferred embodiment of the present invention in which a second portion SP facing a flat conductor without a magnetic sheet 13 therebetween is provided at only substantially one side of a rectangle which is the shape of a loop-shaped conductor 11, and FIG. 8B is a diagram showing an example in which a second portion SP is further narrowed to provide a first portion FP throughout both sides of one side of a rectangle. FIG. 8C is a diagram showing an example in which a magnetic sheet is interposed (covered) only at substantially one side of a rectangle which is the shape of a loop-shaped conductor 11, and the remaining three sides serve as a second portion SP.

FIG. 10 is a perspective view of a communication terminal apparatus 403 of a third preferred embodiment of the present invention.

DETAILED DESCRIPTION OF THE PREFERRED EMBODIMENTS

First Preferred Embodiment

An antenna module, an antenna device, an RFID tag, and a communication terminal apparatus of a first preferred embodiment of the present invention will be described in turn with reference to the drawings.

Figure 1A:
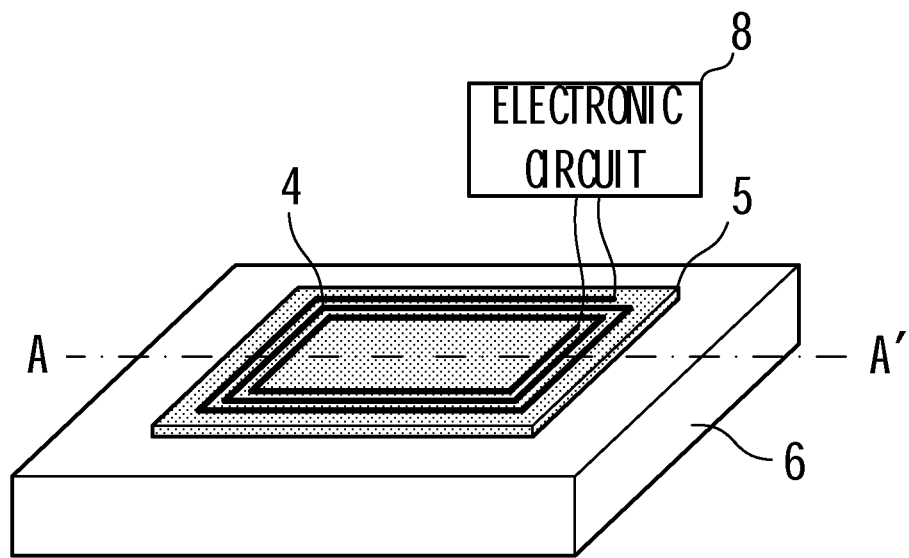
FIG. 1A is a perspective view of an antenna for a reader/writer shown in Japanese Patent Unexamined Publication No.
Figure 1B:
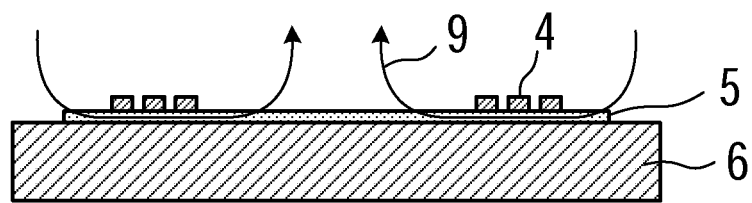
FIG. 1B is a cross-sectional view of an A-A' portion of FIG. 1A.
Figure 2A:
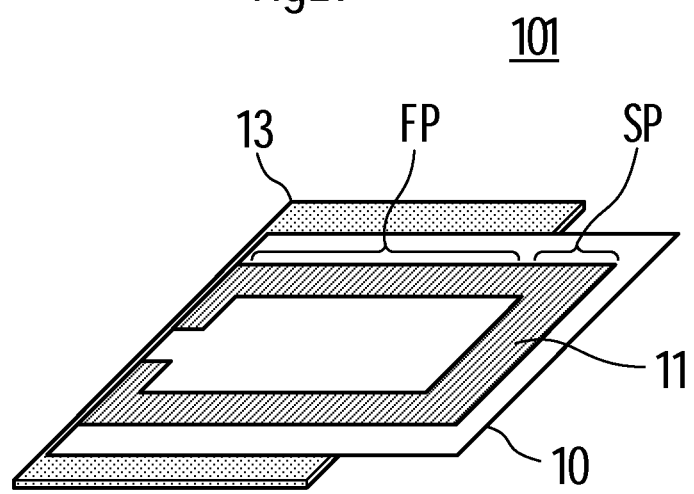
FIG. 2A is an external perspective view of an antenna module 101 according to a first preferred embodiment of the present invention.
Figure 2B:
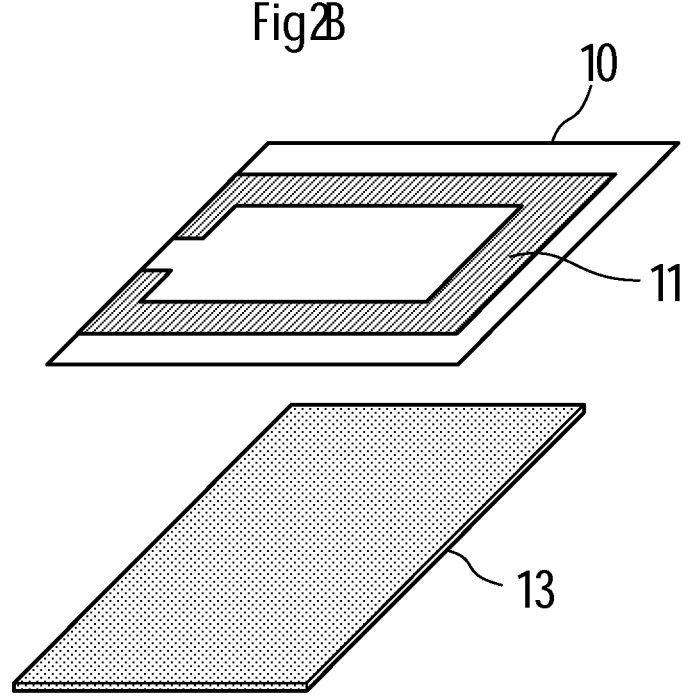
FIG. 2B is an exploded perspective view thereof.

FIG. 2A is an external perspective view of an antenna module 101 according to the first preferred embodiment, and FIG. 2B is an exploded perspective view thereof.

The antenna module 101 includes a loop-shaped conductor 11 and a magnetic sheet 13. The loop-shaped conductor 11 preferably is a rectangular or substantially rectangular loop-shaped conductive pattern formed on a base sheet 10. As will be shown later, the antenna module 101 is affixed, abuts, or is disposed close to a flat conductor, by which an antenna device is provided. Then, the magnetic sheet 13 is disposed between the loop-shaped conductor 11 and the flat conductor.

The loop-shaped conductor 11 includes a first portion FP facing the flat conductor with the magnetic sheet 13 therebetween; and a second portion SP coupled to the flat conductor 12 in an electromagnetic field without the magnetic sheet 13 therebetween. That is, the magnetic sheet 13 is interposed between the first portion FP of the loop-shaped conductor 11 and the flat conductor, and the magnetic sheet 13 is not interposed between the second portion SP of the loop-shaped conductor 11 and the flat conductor.

The base sheet 10 is, for example, a flexible base sheet such as a PET film or a polyimide film, and the loop-shaped conductor 11 is obtained by patterning a metal foil such as a copper foil. The magnetic sheet 13 is, for example, a ferrite ceramic preferably having a sheet-shaped configuration. Alternatively, the magnetic sheet 13 may be a resin sheet formed by dispersing magnetic filler of ferrite or the like in a resin, for example.

FIG. 3A is a perspective view of an RFID tag 301, and FIG. 3B is an exploded perspective view thereof. The RFID tag 301 is obtained preferably by mounting an RFIC element 14 on the base sheet 10 of the antenna module 101 shown in FIG. 2A. The RFIC element 14 includes at least two terminals, and a first terminal is connected to a first end of the loop-shaped conductor 11 and a second terminal is connected to a second end of the loop-shaped conductor 11. As will be shown later, the RFID tag 301 is affixed or disposed close to a flat conductor. At that time, the magnetic sheet 13 is disposed between the loop-shaped conductor 11 and the flat conductor. Accordingly, an item with an RFID tag or a communication terminal apparatus having RFID function is provided.

Figure 4:
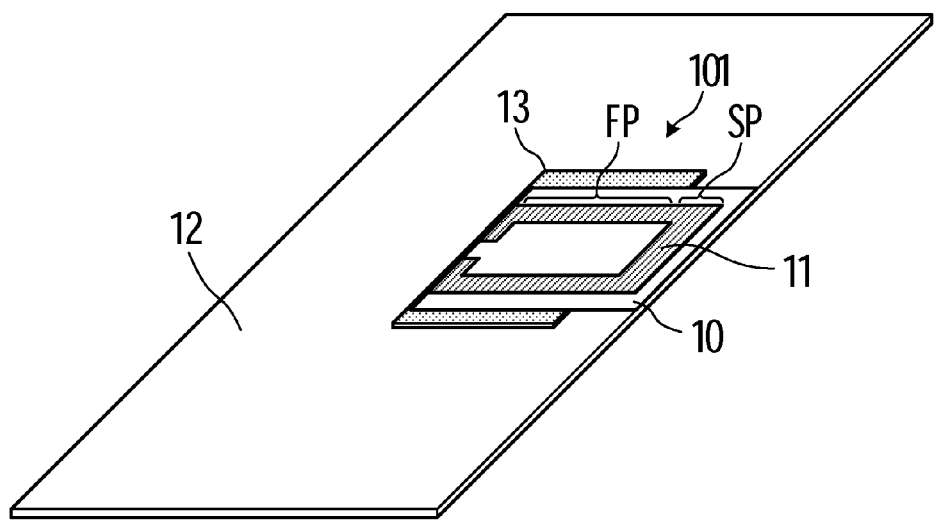
FIG. 4 is a perspective view of an antenna device 201.

FIG. 4 is a perspective view of an antenna device 201. The antenna device 201 includes the antenna module 101 shown in FIG. 2A and a flat conductor 12. The flat conductor 12 has an area larger than the loop-shaped conductor 11, and the loop-shaped conductor 11 is located within the area of the flat conductor 12 when viewed from the top. The magnetic sheet 13 is disposed between the loop-shaped conductor 11 and the flat conductor 12.

The magnetic sheet 13 is interposed between the first portion FP of the loop-shaped conductor 11 and the flat conductor 12, and the magnetic sheet 13 is not interposed between the second portion SP of the loop-shaped conductor 11 and the flat conductor 12. The flat conductor 12 is a ground conductor of a printed wiring board, a metal plate, a metal member of an electronic component or a structural component, or the like.

FIG. 5A is a perspective view of a communication terminal apparatus 401, and FIG. 5B is an exploded perspective view thereof. The communication terminal apparatus 401 includes a flat conductor 12 and the RFID tag 301. The flat conductor 12 is, for example, a ground conductor located on a printed wiring board. That is, a printed wiring board contained in a housing of the communication terminal apparatus can also be used as a flat conductor.

Alternatively, for example, when the flat conductor 12 is a metal item or an item having a flat conductor, by affixing the RFID tag 301 to the item, the item with the RFID tag is provided.

Figure 6A:
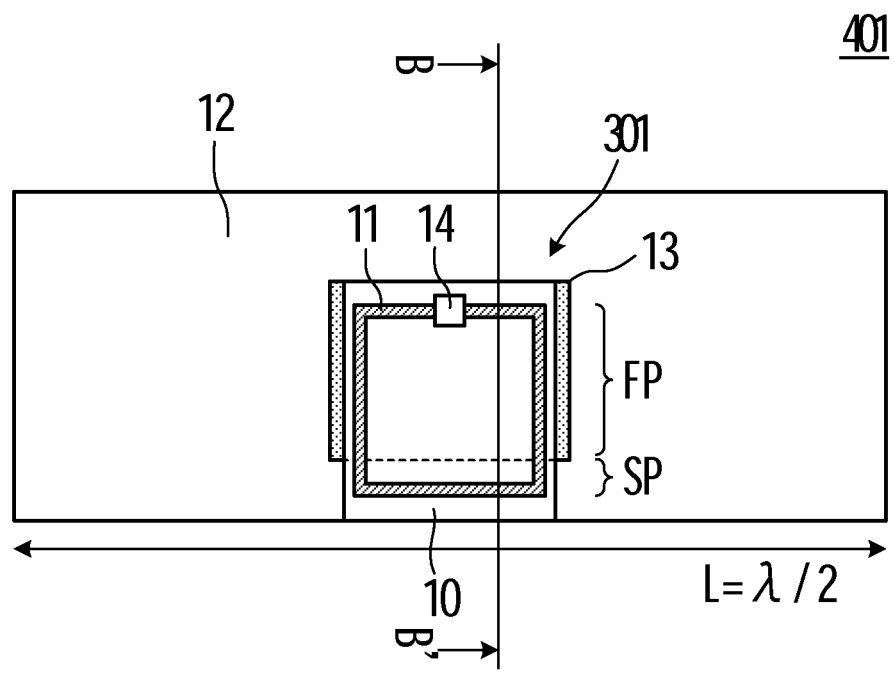
FIG. 6A is a plan view of the communication terminal apparatus 401.
Figure 6B:
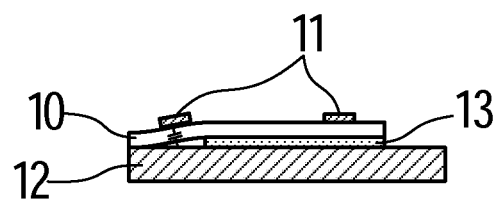
FIG. 6B is a cross-sectional view of a B-B' portion of FIG. 6A.

FIG. 6A is a plan view of the communication terminal apparatus 401, and FIG. 6B is a cross-sectional view of a B-B' portion of FIG. 6A. A circuit symbol for a capacitor in FIG. 6B represents a capacitance generated between the second portion SP of the loop-shaped conductor 11 and the flat conductor 12.

Figure 7A:
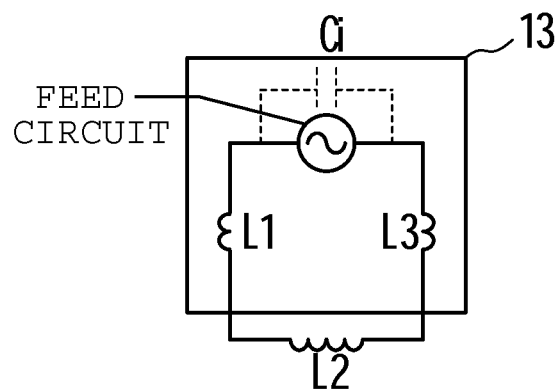
FIG. 7A is an equivalent circuit diagram of the RFID tag 301.

FIG. 7A is an equivalent circuit diagram of the RFID tag 301. The RFIC element 14 includes therein a capacitance Ci, and an LC resonant circuit includes inductors L1, L2, and L3 defined by the loop-shaped conductor 11 and the capacitance Ci. The inductance of the inductors L1 and L3 at a portion of the loop-shaped conductor 11 that is shielded by the magnetic sheet 13 is relatively small, and the inductance of the inductor L2 at a portion of the loop-shaped conductor 11 that is not shielded by the magnetic sheet 13 is relatively large.

Figure 7B:
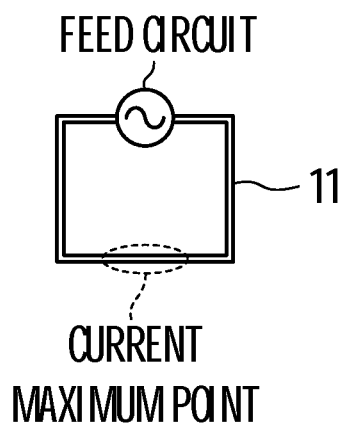
FIG. 7B is a diagram showing the relationship between a feed point and a current maximum point of a loop-shaped conductor 11.

FIG. 7B is a diagram showing the relationship between a feed point and a current maximum point of the loop-shaped conductor 11. The RFIC element 14 (a feed circuit of the RFIC element 14) is connected to the first and second ends of the loop-shaped conductor 11. A differential potential is applied to the loop-shaped conductor 11 from the feed circuit at a resonance frequency at which the loop-shaped conductor 11 achieves impedance matching with the feed circuit, and a central location between the first and second ends of the loop-shaped conductor 11 (a location farthest from the feed circuit) is a current maximum point. The current maximum point is also a virtual ground potential. The above-described resonance frequency is, for example, a frequency in the UHF band such as the 900 MHz band.

Figure 7C:
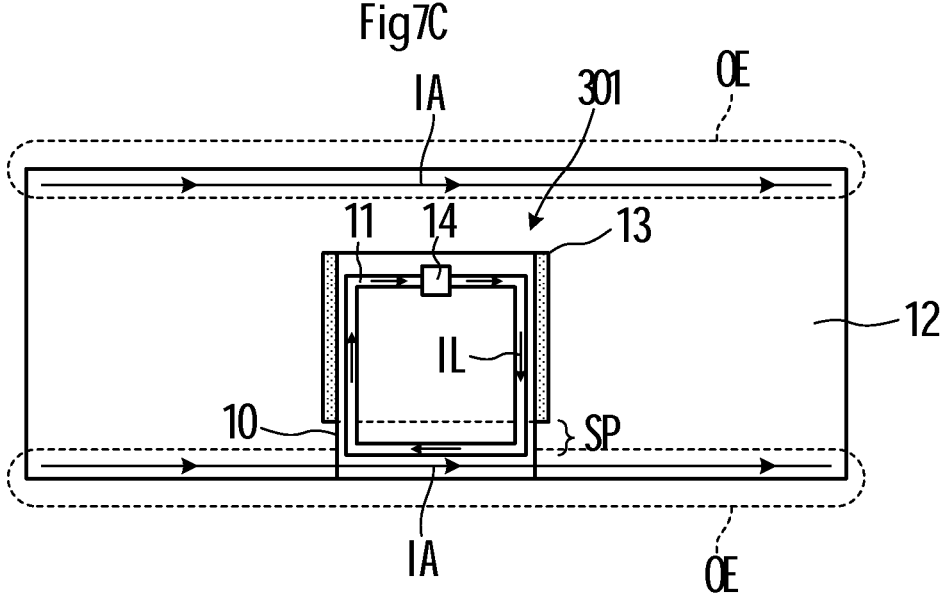
FIG. 7C is a diagram showing the states of a current flowing through the loop-shaped conductor 11 of the RFID tag and currents flowing through a flat conductor 12.

FIG. 7C is a diagram showing the states of a current flowing through the loop-shaped conductor 11 of the RFID tag and currents flowing through the flat conductor 12. When high-frequency power with the above-described resonance frequency (UHF band) is supplied to the loop-shaped conductor 11 from the RFIC element 14, the loop-shaped conductor 11 is coupled to the flat conductor 12 in an electromagnetic field by a current IL flowing through the loop-shaped conductor 11, and induced currents IA flow through the flat conductor 12. At this time, due to the edge effect, the current density of edge portions OE of the flat conductor 12 is high. Hence, the RFID tag 301 is disposed on the flat conductor 12 such that the second portion SP of the loop-shaped conductor 11 extends along one end of the flat conductor 12. In general, it is sufficient that the second portion SP of the loop-shaped conductor 11 be disposed at a location closer to the side of one end edge portion of the flat conductor 12 than the center (the center of gravity) of the flat conductor 12. For a longitudinal direction of the flat conductor, it is sufficient that the second portion SP of the loop-shaped conductor 11 be disposed at a central location thereof or near the center thereof.

By propagation of the induced currents IA through the flat conductor 12, the flat conductor 12 acts as a radiation element. When the wavelength of the used frequency band is represented by $\lambda$, it is preferred that a dimension L in the longitudinal direction of the flat conductor 12 be $L=\lambda/2$ or $L\approx\lambda/2$, for example. Accordingly, the flat conductor 12 acts as a half-wave radiation element (dipole antenna).

In addition, since only the second portion SP of the loop-shaped conductor equivalently faces the flat conductor, even if there are variations in the size of the flat conductor or in the disposition location of the loop-shaped conductor with respect to the flat conductor, the resonance frequency of the resonant circuit including the loop-shaped conductor and the feed circuit does not change much. Hence, a reduction in gain due to a shift in resonance frequency can also be avoided.

Since the length L in the longitudinal direction of the flat conductor 12 is on the order of a half wavelength of the used frequency, the directions of currents flowing through the two edge portions OE are the same, and thus, a current that goes around the perimeter of the flat conductor 12 does not flow.

With the structure shown above, the flat conductor 12 disposed near the loop-shaped conductor 11 can be used as an antenna element, and thus, the communication terminal apparatus 401 including a compact and slim RFID tag with a long communication distance can be obtained without increasing the size of the loop-shaped conductor 11.

The second portion SP of the loop-shaped conductor 11 includes the above-described current maximum point. It is preferred that the loop-shaped conductor 11 be coupled to the flat conductor 12 in an electromagnetic field in a region including the current maximum point. That is, in the loop-shaped conductor 11, the current density is low near the feed point, and the current density is high at a location farthest from the feed point. Thus, if the loop-shaped conductor 11 is coupled to the flat conductor 12 at the second portion SP including a portion of the loop-shaped conductor 11 that has the highest current density, unwanted coupling between the loop-shaped conductor 11 and the flat conductor 12 (coupling in which a current flowing through the flat conductor 12 by the coupling does not contribute to radiation) is suppressed or prevented, enabling to obtain an RFID tag with small insertion loss and the communication terminal apparatus 401 including the RFID tag.

It is preferred that the loop-shaped conductor 11 be disposed close to the flat conductor 12 such that a surface defined by the loop-shaped conductor 11 extends along a surface of the flat conductor 12. In other words, it is preferred that the central axis of the loop-shaped conductor 11 be oriented in the direction of the normal to the flat conductor 12. According to the present preferred embodiment of the present invention, since such disposition is possible, an RFID tag can be disposed along the surface of the flat conductor 12 thus making it possible to achieve reduction in overall thickness.

It is preferred that the loop-shaped conductor 11 be disposed close to the flat conductor 12 such that the second portion SP thereof is near an end edge portion of the flat conductor 12. It is particularly preferred that the second portion SP of the loop-shaped conductor 11 be linear, and the loop-shaped conductor 11 be disposed close to the flat conductor 12 so as to be parallel or substantially parallel to a linear end edge portion of the flat conductor 12. With such a configuration, while eddy current loss in the loop-shaped conductor 11 is suppressed or prevented, the distance between one of the main radiation portions (the end edge portions of the flat conductor 12) and the current maximum point of the loop-shaped conductor 11 is shortest, enabling reduction in power loss.

In addition to using, as a flat conductor, a ground conductor which is originally provided on a printed wiring board, it is also possible that the RFID tag 301 is disposed near a battery pack and a metal housing of the battery pack or a shield case is used as a flat conductor. In addition, if an electronic device includes a metal housing, the metal housing can be used as a flat conductor.

Second Preferred Embodiment

A second preferred embodiment of the present invention shows differences in characteristic by differences in size between a first portion and a second portion of a loop-shaped conductor.

FIG. 8A shows an example in which a second portion SP facing a flat conductor without a magnetic sheet 13 therebetween is provided at only substantially one side of a rectangle which is the shape of a loop-shaped conductor 11, and FIG. 8B shows an example in which a second portion SP is further narrowed to provide a first portion FP throughout both sides of one side of a rectangle. FIG. 8C shows an example in which, contrary to FIG. 8A, a magnetic sheet is interposed (covered) only at substantially one side of a rectangle which is the shape of a loop-shaped conductor 11, and the remaining three sides serve as a second portion SP. In the state of FIG. 8C, a portion of the loop-shaped conductor 11 that has a potential difference (voltage is high) faces a flat conductor 12. In the state of FIG. 8B, a portion of the loop-shaped conductor 11 that has a potential difference (voltage is high) does not face a flat conductor 12 almost at all.

Figure 9:
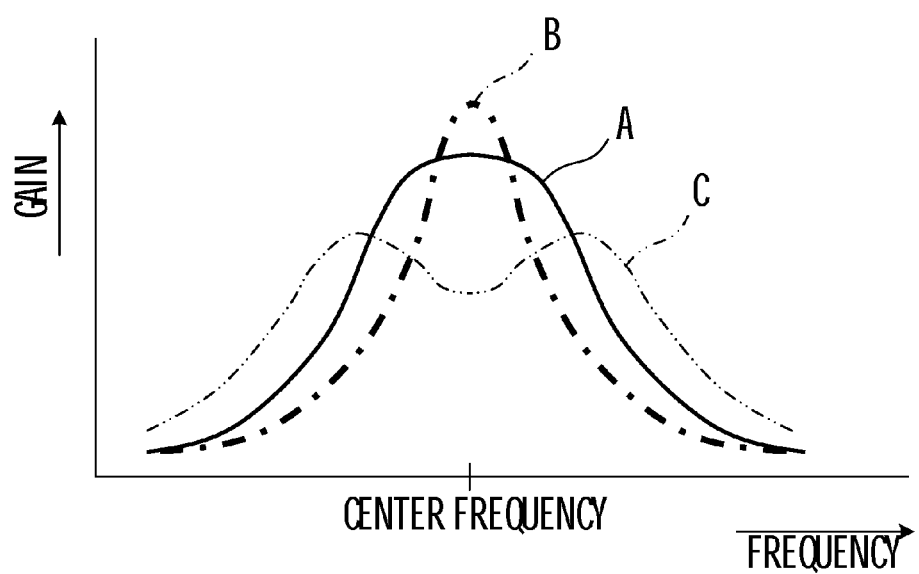
FIG. 9 is a diagram showing the characteristics of RFID tags in the states shown in FIGS. 8A, 8B, and 8C.

FIG. 9 is a diagram showing the characteristics of RFID tags in the states shown in FIGS. 8A, 8B, and 8C. As such, in the case where the second portion SP is smaller in ratio than the first portion FP of the loop-shaped conductor 11, the Q-value is high and the gain is maximum at the center frequency. Then, the larger the ratio of the second portion SP than the first portion FP of the loop-shaped conductor 11, the stronger the electric field coupling between the loop-shaped conductor 11 and the flat conductor 12. In addition, electric field coupling also occurs at a portion of the loop-shaped conductor 11 that has a large potential difference, resulting in a mode in which electric field coupling occurs at two points with different potential differences in the loop-shaped conductor 11. Thus, the passband increases, reducing the peak of the gain. Accordingly, the ratio of the second portion SP to the first portion FP of the loop-shaped conductor 11 is determined according to the required frequency bandwidth and gain.

Third Preferred Embodiment

Figure 11A:
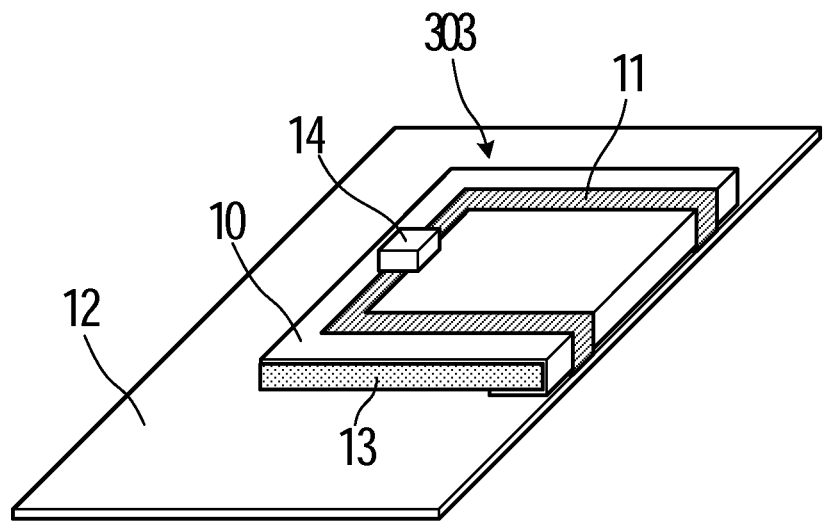
FIG. 11A is an enlarged view of a portion where an RFID tag 303 is mounted.
Figure 11B:
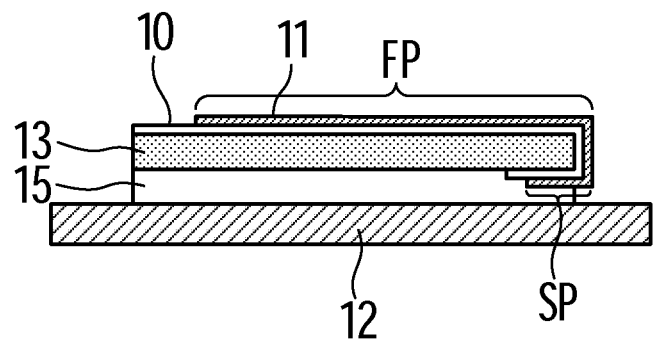
FIG. 11B is a left side view thereof.

FIG. 10 is a perspective view of a communication terminal apparatus 403 of a third preferred embodiment of the present invention. FIG. 11A is an enlarged view of a portion where an RFID tag 303 is mounted, and FIG. 11B is a left side view thereof. The communication terminal apparatus 403 includes a flat conductor 12 and the RFID tag 303. The structure of the RFID tag 303 is different from that of the RFID tag 301 shown in the first and second preferred embodiments. In the RFID tag 303, a portion of a base sheet 10 including a rectangular or substantially rectangular loop-shaped conductor 11 patterned thereon is folded from a first main surface (top surface) of a magnetic sheet 13 over a second main surface (undersurface). The RFID tag 303 is adhered onto the flat conductor 12 by an adhesive layer 15, for example.

Only substantially one side of a rectangle which is the shape of the loop-shaped conductor 11 is disposed on the second main surface (undersurface) of the magnetic sheet 13. This one side serves as a second portion SP where the magnetic sheet 13 is not interposed when viewed from the flat conductor 12. A portion other than this portion serves as a first portion FP where the magnetic sheet 13 is interposed when viewed from the flat conductor 12.

As such, the second portion SP of the loop-shaped conductor can be provided even at a portion along the magnetic sheet. According to the third preferred embodiment, since the entire base sheet 10 is disposed so as to enclose the magnetic sheet, handling of the RFID tag and mounting of the RFID tag on the flat conductor 12 are facilitated.

Fourth Preferred Embodiment

Figure 12:
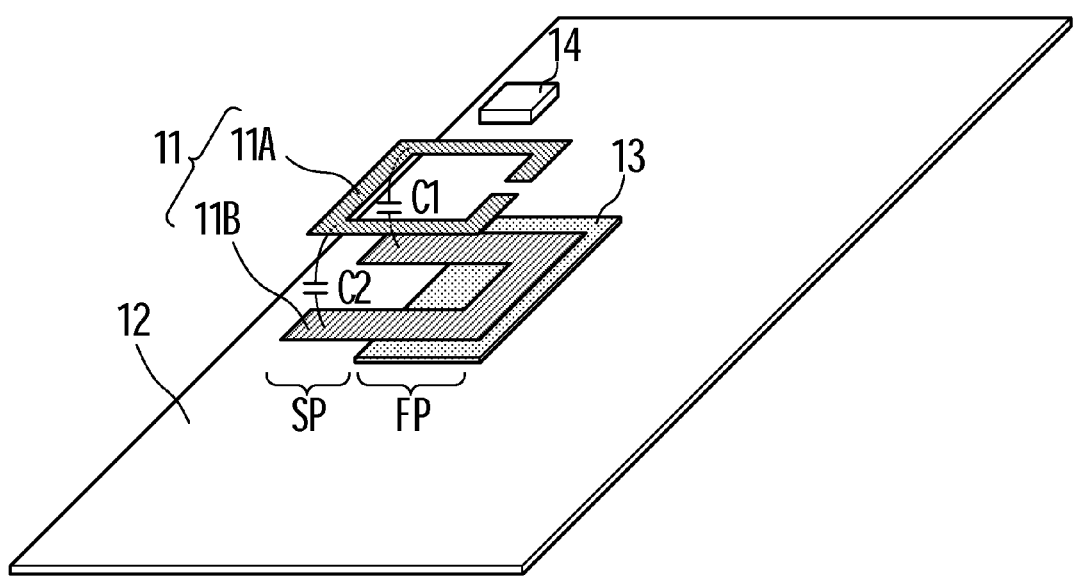
FIG. 12 is a perspective view of a communication terminal apparatus 404 of a fourth preferred embodiment of the present invention.

FIG. 12 is a perspective view of a communication terminal apparatus 404 of a fourth preferred embodiment of the present invention. A loop-shaped conductor includes a first auxiliary conductor 11A and a second auxiliary conductor 11B. The first auxiliary conductor 11A and the second auxiliary conductor 11B are coupled to each other by capacitances C1 and C2. Note, however, that the capacitances C1 and C2 in the drawing are only represented by symbols in terms of a lumped parameter circuit, and are actually distributed capacitances. In the loop-shaped conductor configured by the two auxiliary conductors 11A and 11B, a second portion SP is viewed from a flat conductor 12 because a magnetic sheet 13 is not interposed, but a first portion FP is not equivalently viewed from the flat conductor 12 due to the interposition of the magnetic sheet 13.

Figure 13:
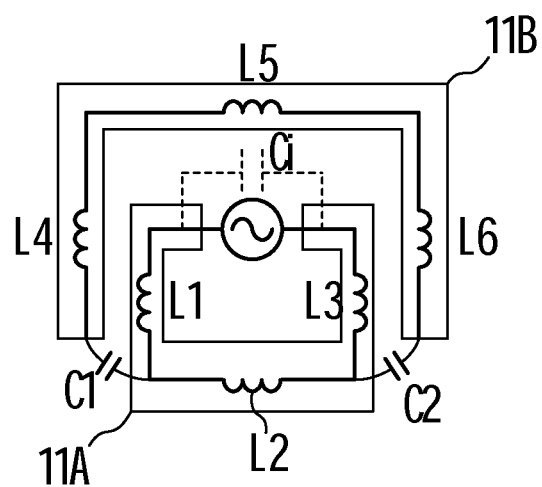
FIG. 13 is an equivalent circuit diagram of an RFID tag portion shown in FIG. 12.

FIG. 13 is an equivalent circuit diagram of an RFID tag portion shown in FIG. 12. Here, the first auxiliary conductor 11A is represented by inductors L1, L2, and L3, and the second auxiliary conductor 11B is represented by inductors L4, L5, and L6. A first LC resonant circuit includes a capacitance Ci in an RFIC element 14 and the inductors L1, L2, and L3 of the first auxiliary conductor 11A. In addition, a second LC resonant circuit includes capacitances C1 and C2 between the first auxiliary conductor 11A and the second auxiliary conductor 11B and the inductors L4, L5, and L6 of the second auxiliary conductor 11B. A resonance frequency f1 of the first LC resonant circuit and a resonance frequency f2 of the second LC resonant circuit can be expressed as follows.

$$f1=1/[2\pi\sqrt{\{Ci(L1+L2+L3)\}}]$$

$$f2=1/[2\pi\sqrt{\{(C1+C2)(L1+L2+L3+L4+L5+L6)\}}]$$

Since there is mutual inductance between the inductance (L1, L2, and L3) of the first auxiliary conductor 11A and the inductance (L4, L5, and L6) of the second auxiliary conductor 11B, the first LC resonant circuit and the second LC resonant circuit are coupled to each other.

Figure 14:
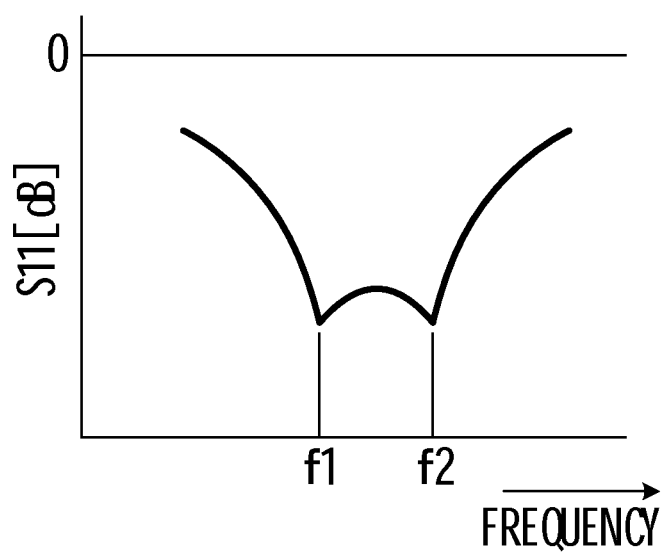
FIG. 14 is a diagram showing a return loss characteristic when viewed from a feed circuit of the RFID tag portion shown in FIG. 12.

FIG. 14 shows a return loss characteristic when viewed from a feed circuit of the RFID tag portion shown in FIG. 12. As described above, since there are two resonance frequencies f1 and f2, and f1 and f2 are different from each other, widening of the frequency band can be achieved as shown in FIG. 14. Note that, due to the influence of the above-described mutual inductance, the frequency interval between two poles of the return loss characteristic is further extended. The mutual inductance can be adjusted by making the shapes of the first auxiliary conductor and the second auxiliary conductor different from each other, or displacing the positions of the first auxiliary conductor and the second auxiliary conductor, or partially interposing a magnetic sheet between the first auxiliary conductor and the second auxiliary conductor, or the like. In this manner, the frequency interval between the two poles may be determined.

Fifth Preferred Embodiment

Figure 15A:
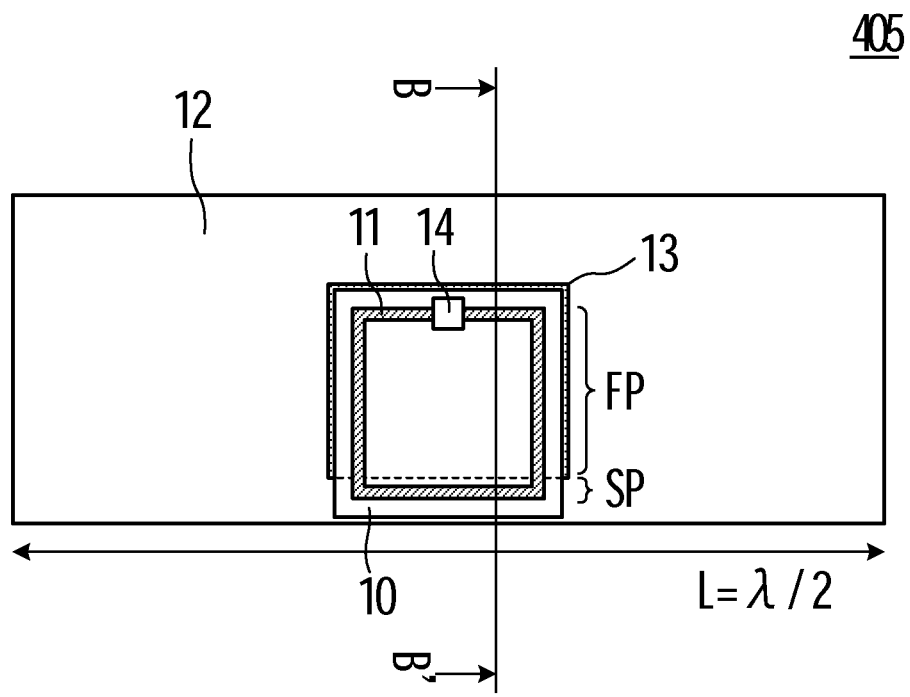
FIG. 15A is a plan view of a communication terminal apparatus 405 of a fifth preferred embodiment of the present invention.
Figure 15B:
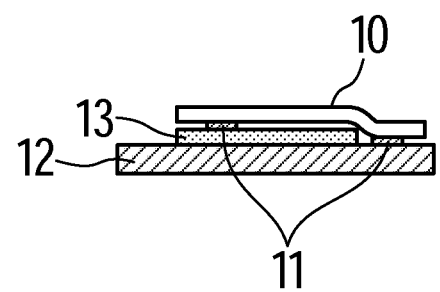
FIG. 15B is a cross-sectional view of a B-B' portion of FIG. 15A.

FIG. 15A is a plan view of a communication terminal apparatus 405 of a fifth preferred embodiment, and FIG. 15B is a cross-sectional view of a B-B' portion of FIG. 15A. In this example, a loop-shaped conductor 11 is patterned on an under surface of a base sheet 10. The loop-shaped conductor 11 includes a first portion FP facing a flat conductor with a magnetic sheet 13 therebetween, and a second portion SP directly electrically connected to the flat conductor 12 without the magnetic sheet 13 therebetween.

An RFIC element 14 (a feed circuit of the RFIC element 14) is connected to a first end and a second end of the loop-shaped conductor 11. The RFIC element includes therein a capacitance. By this capacitance and an inductance of the loop-shaped conductor 11, an LC resonant circuit is provided. A differential potential is applied to the loop-shaped conductor 11 from the feed circuit at a resonance frequency at which the loop-shaped conductor 11 achieves impedance matching with the feed circuit, and a central location between the first and second ends of the loop-shaped conductor 11 (a location farthest from the feed circuit) is a current maximum point. The current maximum point is also a virtual ground potential. The above-described resonance frequency is, for example, a frequency in the UHF band such as the 900 MHz band.

Figure 16:
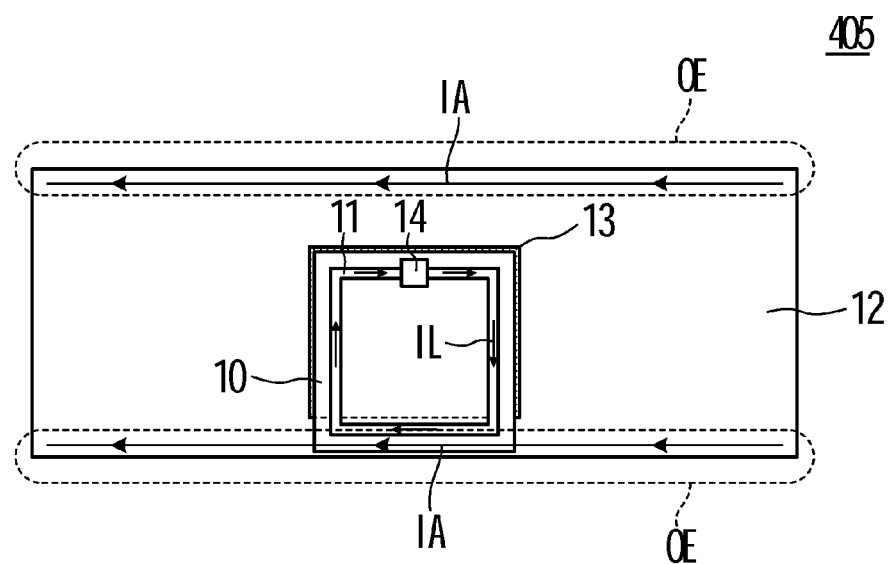
FIG. 16 is a diagram showing the states of a current flowing through a loop-shaped conductor 11 of an RFID tag and currents flowing through a flat conductor 12.

FIG. 16 is a diagram showing the states of a current flowing through the loop-shaped conductor 11 of an RFID tag and currents flowing through the flat conductor 12. When high-frequency power with the above-described resonance frequency (UHF band) is supplied to the loop-shaped conductor 11 from the RFIC element 14, currents IA flow through the flat conductor 12 by a current IL flowing through the loop-shaped conductor 11. Since there is direct coupling instead of inductive coupling shown in FIG. 7C, the directions of the currents IA are the same as that of the current IL flowing through the loop-shaped conductor 11. At this time, due to the edge effect, the current density of edge portions OE of the flat conductor 12 is high. Hence, the RFID tag 301 is disposed on the flat conductor 12 such that the second portion SP of the loop-shaped conductor 11 extends along one end of the flat conductor 12. In general, it is sufficient that the second portion SP of the loop-shaped conductor 11 be disposed at a location closer to the side of one end edge portion of the flat conductor 12 than the center (the center of gravity) of the flat conductor 12.

By propagation of the induced currents IA through the flat conductor 12, the flat conductor 12 acts as a radiation element. When the wavelength of the used frequency band is represented by λ, it is preferred that a dimension L in the longitudinal direction of the flat conductor 12 be L=λ/2 or L≈λ/2, for example. Accordingly, the flat conductor 12 acts as a half-wave radiation element.

With the structure shown above, the flat conductor 12 disposed near the loop-shaped conductor 11 can be used as an antenna element, and thus, the communication terminal apparatus 405 including a compact and slim RFID tag with a long communication distance can be obtained without increasing the size of the loop-shaped conductor 11.

It is preferred that the second portion SP of the loop-shaped conductor 11 include the above-described current maximum point, and the loop-shaped conductor 11 be directly coupled (directly electrically connected) to the flat conductor 12 in a region including the current maximum point. That is, in the loop-shaped conductor 11, the current density is low near a feed point, and the current density is high at a location farthest from the feed point. Thus, if the loop-shaped conductor 11 is coupled to the flat conductor 12 at the second portion SP including a portion of the loop-shaped conductor 11 that has the highest current density, unwanted coupling between the loop-shaped conductor 11 and the flat conductor 12 (coupling in which a current flowing through the flat conductor 12 by the coupling does not contribute to radiation) is suppressed or prevented, which makes it possible to obtain an RFID tag with small insertion loss and the communication terminal apparatus 405 including the RFID tag.

It is preferred that the loop-shaped conductor 11 be disposed on the flat conductor 12 such that the second portion SP thereof is near an end edge portion of the flat conductor 12. It is particularly preferred that the second portion SP of the loop-shaped conductor 11 be formed linearly, and the loop-shaped conductor 11 be disposed close to the flat conductor 12 so as to be parallel or substantially parallel to a linear end edge portion of the flat conductor 12. By such disposition, while eddy current loss in the loop-shaped conductor 11 is suppressed or prevented, the distance between one of the main radiation portions (the end edge portions of the flat conductor 12) and the current maximum point of the loop-shaped conductor 11 is shortest, thus enabling reduction in power loss.

Sixth Preferred Embodiment

A sixth preferred embodiment of the present invention shows an example of an RFID tag formed by laminating a plurality of sheets.

Figure 17:
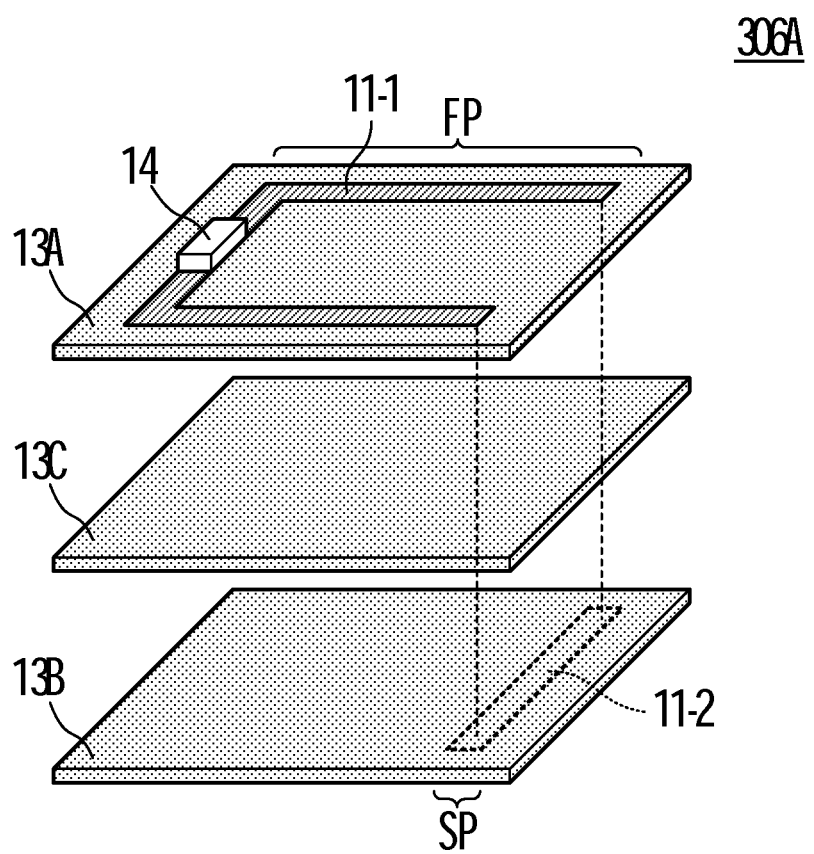
FIG. 17 is an exploded perspective view of an RFID tag 306A of a sixth preferred embodiment of the present invention.

FIG. 17 is an exploded perspective view of an RFID tag 306A of the sixth preferred embodiment. A portion (three sides) 11-1 of a loop-shaped conductor is located on a top surface of a ferrite sheet 13A, and a portion (one side) 11-2 of the loop-shaped conductor is located on an under surface of a ferrite sheet 13B. Then, the loop-shaped conductors 11-1 and 11-2 are connected to each other through via conductors provided in the ferrite sheets 13A, 13B, and 13C. The ferrite sheets 13A and 13B are ferrite with low permeability (e.g., relative permeability μr=1), and the ferrite sheet 13C is ferrite with high permeability (e.g., relative permeability μr=100). An RFIC element 14 is connected to the portion 11-1 of the loop-shaped conductor. Normally, after forming a laminate including the three ferrite sheets 13A, 13B, and 13C, the RFIC element 14 is mounted on the laminate.

In a state where the RFID tag 306A is mounted on a flat conductor such that the portion 11-2 of the loop-shaped conductor is directly electrically connected to the flat conductor, the ferrite sheet 13C is interposed between the portion 11-1 of the loop-shaped conductor and the flat conductor. That is, the portion 11-1 of the loop-shaped conductor defines a first portion FP of the loop-shaped conductor. Since the ferrite sheet 13C is not interposed between the portion 11-2 of the loop-shaped conductor and the flat conductor, the portion 11-2 of the loop-shaped conductor defines a second portion SP of the loop-shaped conductor.

Figure 18:
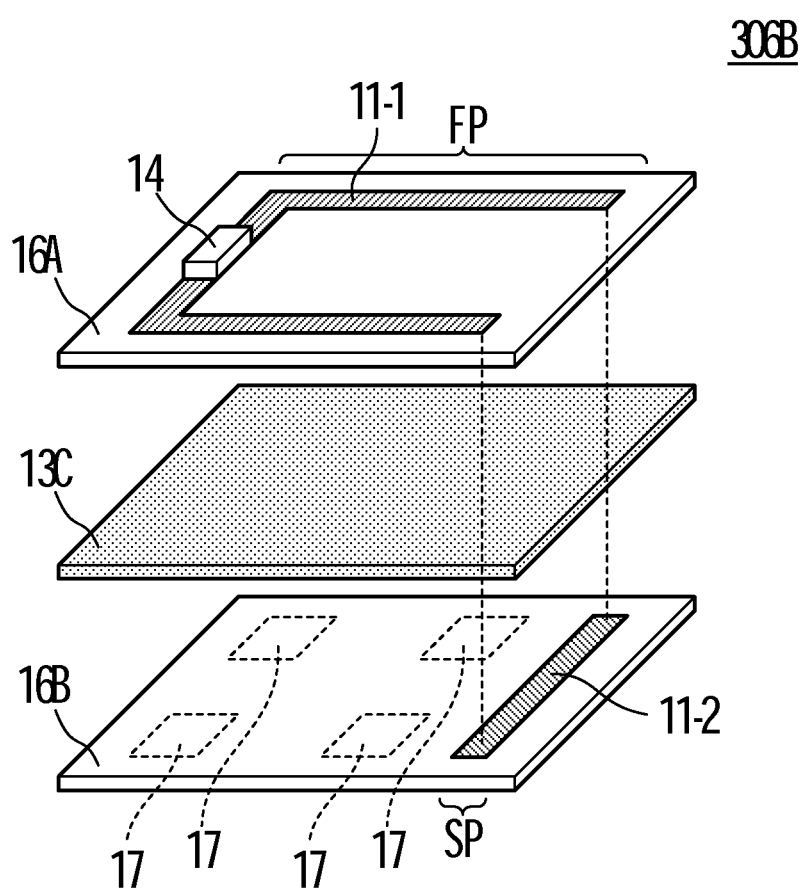
FIG. 18 is an exploded perspective view of another RFID tag 306B of the sixth preferred embodiment of the present invention.

FIG. 18 is an exploded perspective view of another RFID tag 306B of the sixth preferred embodiment. A portion (three sides) 11-1 of a loop-shaped conductor is located on a top surface of a dielectric (non-magnetic) sheet 16A, and a portion (one side) 11-2 of the loop-shaped conductor is located on a top surface of a dielectric (non-magnetic) sheet 16B. Mounting electrodes 17 are located on an under surface of the dielectric sheet 16B. Then, the loop-shaped conductors 11-1 and 11-2 are connected to each other through via conductors provided in the dielectric sheet 16A and a ferrite sheet 13C. An RFIC element 14 is connected to the portion 11-1 of the loop-shaped conductor.

Similarly to the case of the RFID tag 306A, the portion 11-1 of the loop-shaped conductor defines a first portion FP of the loop-shaped conductor, and the portion 11-2 of the loop-shaped conductor defines a second portion SP of the loop-shaped conductor. When the RFID tag 306B is mounted on a flat conductor using the mounting electrodes 17, the portion 11-2 of the loop-shaped conductor faces the flat conductor with the dielectric sheet 16B therebetween, by which the portion 11-2 of the loop-shaped conductor is coupled to the flat conductor in an electromagnetic field.

By using a configuration in which the portion 11-2 of the loop-shaped conductor is located on the same plane as the mounting electrodes 17, and a via conductor is provided in the dielectric sheet 16B, and the portion 11-2 of the loop-shaped conductor is connected to the portion 11-1 of the loop-shaped conductor through the via conductor, the portion 11-2 of the loop-shaped conductor can be directly electrically connected (DC coupled) to the flat conductor.

Other Preferred Embodiments

An RFIC element shown in each of the above-described preferred embodiments preferably is a circuit including a memory circuit and a logic circuit, but may be an IC element including only a high-frequency circuit. Alternatively, the RFIC element may include a matching circuit such as an RFIC chip and a resonant circuit connected to the chip. Then, the configuration may be such that a loop-shaped conductor is coupled to the matching circuit in an electromagnetic field.

An antenna device according to various preferred embodiments of the present invention is not only used as an RFID tag in a UHF-band RFID system, but can also be used as an antenna device for a reader/writer, for example. In addition, an antenna device according to various preferred embodiments of the present invention can be used in other frequency bands such as the HF band or can be used in other communication systems than an RFID system, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
    an antenna module including a loop-shaped conductor to which a feed circuit is connected or coupled, and a magnetic sheet provided in parallel or substantially in parallel to the loop-shaped conductor; and
    a flat conductor disposed so as to face the antenna module, and having an area larger than the loop-shaped conductor; wherein
    the loop-shaped conductor includes a first portion facing the flat conductor with the magnetic sheet therebetween, and a second portion directly electrically connected or coupled in an electromagnetic field to the flat conductor without the magnetic sheet therebetween;
    the loop-shaped conductor includes a feed point connected or coupled to the feed circuit, and a current maximum point spaced away from the feed point, and the second portion is a region including the current maximum point;
    the loop-shaped conductor is disposed close to the flat conductor such that a surface defined by the loop-shaped conductor extends along a surface of the flat conductor; and
    the loop-shaped conductor is disposed at a location where the second portion is closer to an end edge portion side of the flat conductor than a center or approximate center of the flat conductor.

2. The antenna device according to claim 1, wherein the second portion of the loop-shaped conductor is linear, and the loop-shaped conductor is parallel or substantially parallel to a linear end edge portion of the flat conductor.

3. The antenna device according to claim 1, wherein the flat conductor is a ground conductor located on a printed wiring board.

4. An RFID tag comprising:
    the antenna device according to claim 1; and
    an RFIC element directly connected or coupled in an electromagnetic field to the loop-shaped conductor of the antenna device.

5. The RFID tag according to claim 4, wherein the first portion the loop-shaped conductor is located on a top surface of a first ferrite sheet, and the second portion of the loop-shaped conductor is located on an under surface of a second ferrite sheet, and the first and second portions are connected to each other by via conductors.

6. The RFID tag according to claim 4, wherein the first portion the loop-shaped conductor is located on a top surface of a first non-magnetic sheet, and the second portion of the loop-shaped conductor is located on a top surface of a second non-magnetic sheet, and the first and second portions are connected to each other by via conductors.

7. A communication terminal apparatus comprising:
    the antenna device according to claim 1; and
    an RFIC element directly connected or coupled in an electromagnetic field to the loop-shaped conductor.

8. The communication terminal apparatus according to claim 7, wherein the flat conductor is a ground conductor located on a printed wiring board.

9. The communication terminal apparatus according to claim 7, wherein the RFIC element is configured to operate in a UHF-band RFID system where the RFIC element achieves matching with the loop-shaped conductor in a UHF band.

10. The communication terminal apparatus according to claim 7, wherein the loop-shaped conductor includes a base sheet and a rectangular or substantially rectangular loop-shaped conductive pattern located on the base sheet, a portion of the base sheet including the rectangular or substantially rectangular loop-shaped conductor is folded from a first main surface of the magnetic sheet over a second main surface thereof.

11. The communication terminal apparatus according to claim 7, wherein the loop-shaped conductor includes a first auxiliary conductor and a second auxiliary conductor coupled to each other by at least one capacitance.

12. The communication terminal apparatus according to claim 7, wherein the loop-shaped conductor includes a base sheet and a loop-shaped conductor patterned on an under surface of the base sheet, the first portion of the loop-shaped conductor faces the flat conductor with the magnetic sheet therebetween, and the second portion of the loop-shaped conductor is electrically connected to the flat conductor without the magnetic sheet therebetween.

13. The antenna device according to claim 1, wherein the loop-shaped conductor includes a base sheet and a rectangular or substantially rectangular loop-shaped conductive pattern located on the base sheet.

14. The antenna device according to claim 13, wherein the base sheet is a PET film or a polyimide film and conductive pattern is a patterned metal foil.

15. The antenna device according to claim 1, wherein the flat conductor is a half-wave radiation element.

16. The antenna device according to claim 1, wherein
    the second portion of the loop-shaped conductor is provided at only substantially one side of a rectangle defining a shape of the loop-shaped conductor.

17. The antenna device according to claim 1, wherein
    the second portion of the loop-shaped conductor includes a narrowed portion and the first portion of the loop-shaped portion extends throughout both sides of one side of a rectangle that defines a shape of the loop-shaped conductor.

18. The antenna device according to claim 1, wherein
    the magnetic sheet is interposed only at substantially one side of a rectangle that defines a shape of the loop-shaped conductor, and three remaining sides of the rectangle define the second portion of the loop-shaped conductor.

* * * * *